US008413525B1

(12) United States Patent
Schultz et al.

(10) Patent No.: US 8,413,525 B1
(45) Date of Patent: Apr. 9, 2013

(54) PORTABLE TORQUE MEASUREMENT AND NOTIFICATION SYSTEM AND METHOD OF USING SAME

(75) Inventors: Roger L. Schultz, Ninnekah, OK (US); Brock Watson, Oklahoma City, OK (US); Greg A. Kliewer, Edmond, OK (US); Robert G. Watson, Baird, TX (US); Andrew Ferguson, Moore, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

(21) Appl. No.: 13/493,363

(22) Filed: Jun. 11, 2012

(51) Int. Cl.
*G01L 1/22* (2006.01)
(52) U.S. Cl. .................. 73/862.338; 73/862.21
(58) Field of Classification Search ............... 73/862.21, 73/862.338
See application file for complete search history.

(56) References Cited

U.S. PATENT DOCUMENTS

| | | | | |
|---|---|---|---|---|
| 4,669,319 A * | 6/1987 | Heyraud | ................ | 73/862.23 |
| 4,982,612 A * | 1/1991 | Rittmann | ................ | 73/862.23 |
| 6,119,562 A * | 9/2000 | Jenkins | ................ | 81/479 |
| 6,276,243 B1 * | 8/2001 | Jenkins | ................ | 81/479 |
| 7,021,180 B2 * | 4/2006 | Crane | ................ | 81/467 |
| 7,819,025 B2 * | 10/2010 | Coffland | ................ | 73/862.21 |
| 7,876,216 B2 * | 1/2011 | Coffland et al. | ......... | 340/539.13 |
| 7,920,124 B2 * | 4/2011 | Tokita et al. | ................ | 345/156 |

\* cited by examiner

*Primary Examiner* — Max Noori
(74) *Attorney, Agent, or Firm* — Belair Intellectual Property Law LLC

(57) ABSTRACT

A portable torque measurement and notification system, including a torque applying device to apply torque to an object, the torque applying device having a handle and a gripping end, the torque applying device including one or more strain gages disposed on the handle to produce one or more strain measurements of the handle during the application of the torque; an electronic circuit disposed about the handle to receive the one or more strain measurements, to convert the strain measurements to one or more torque measurements, and to transmit the one or more torque measurements by a wireless communications standard; a power unit to power the strain gages and electronic circuit; and a wireless device operable to communicate with the torque applying device, the wireless device having a database to store a target torque value and to receive the transmitted one or more torque measurements, and to produce a notifier.

56 Claims, 11 Drawing Sheets

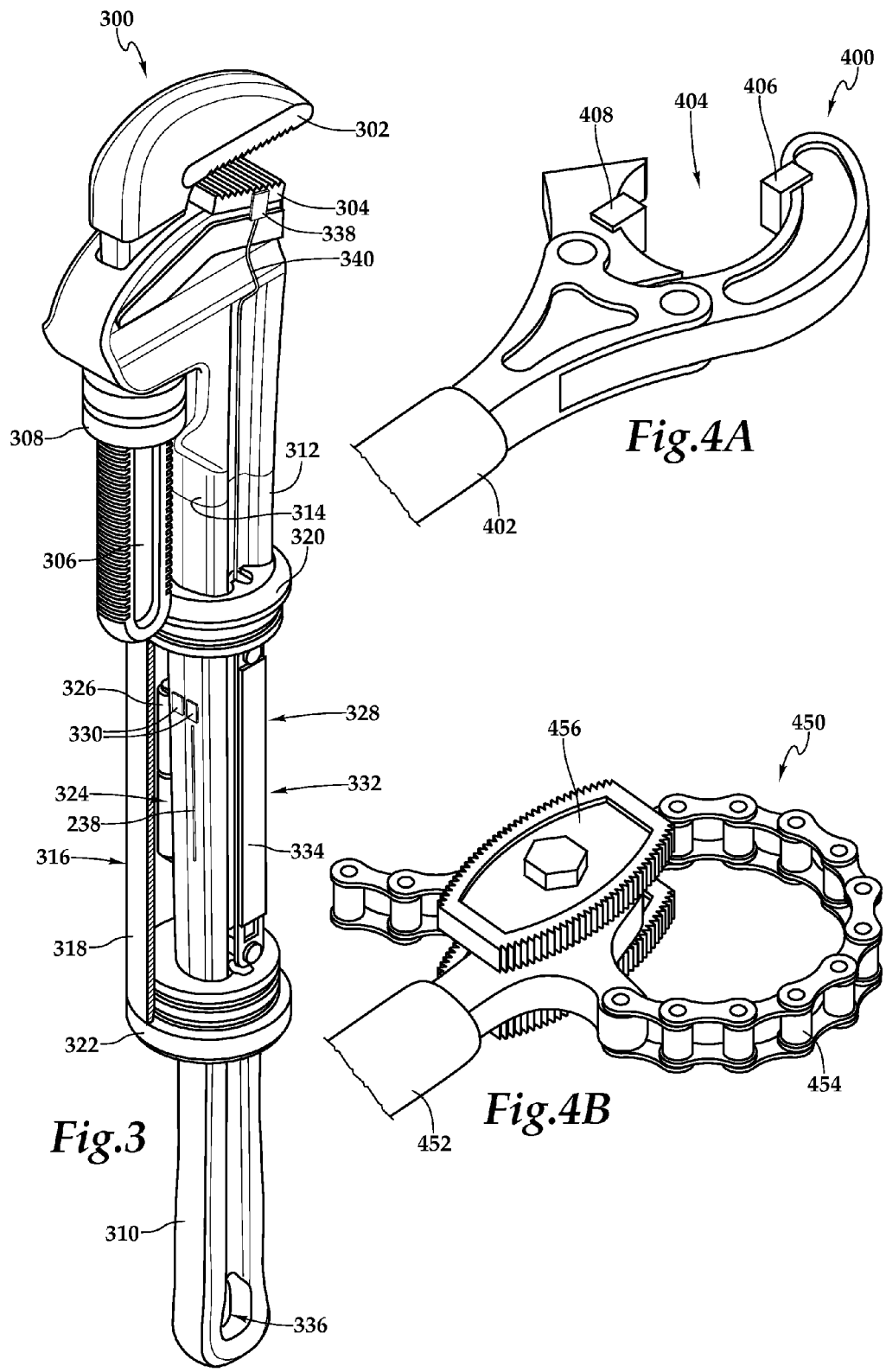

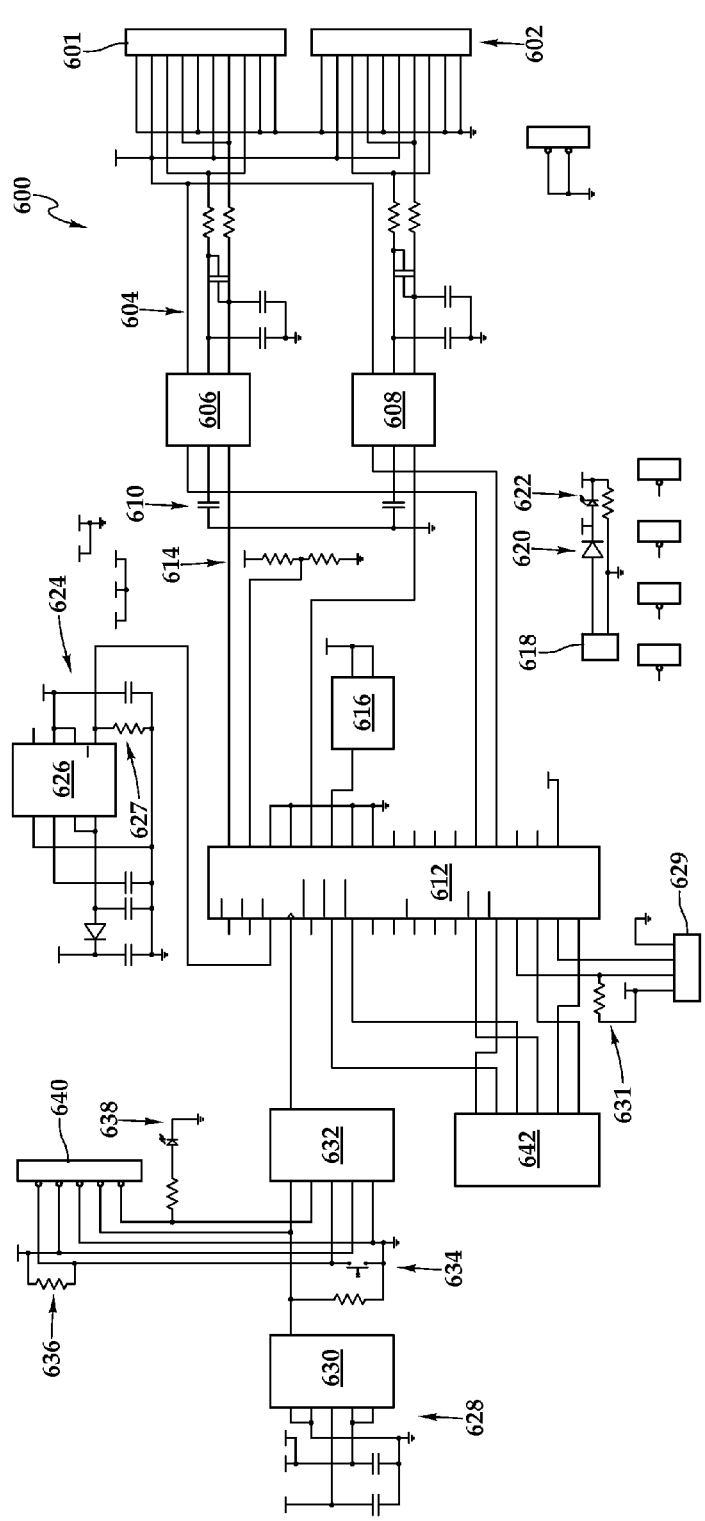
Fig. 6
Fig. 7

| Sequence | | Tone | | | |
|---|---|---|---|---|---|
| # | Duration (ms) | Note | Freq. | Duration (ms) | Repetition |
| 1 | 1000 | A | 1760 | 200 | 1 |
| 2 | 900 | A# | 1864 | 173 | 1 |
| 3 | 800 | B | 1975 | 167 | 1 |
| 4 | 700 | C | 2093 | 150 | 1 |
| 5 | 600 | C# | 2217 | 133 | 1 |
| 6 | 500 | D | 2349 | 117 | 1 |
| 7 | 800 | D# | 2489 | 100 | 2 |
| 8 | 600 | E | 2637 | 73 | 2 |
| 9 | 800 | F | 2793 | 67 | 4 |
| 10 | 500 | F# | 2959 | 50 | 5 |
| 11 | 1000 | G | 3135 | 1000 | 1 |

PORTABLE TORQUE MEASUREMENT AND NOTIFICATION SYSTEM AND METHOD OF USING SAME

TECHNICAL FIELD OF THE INVENTION

This invention relates, in general, to a system for measuring torque applied to an object and, in particular, to a portable torque measurement and notification system and method of using same.

BACKGROUND OF THE INVENTION

Without limiting the scope of the present invention, its background will be described in relation to a portable torque measurement and notification system and method of using same, as an example.

In drilling for oil and gas it is common practice to couple a plurality of tubular members together to produce extended tubular strings, work strings, drillstrings, pipe strings, tubulars, pipe, tool strings, etc. Tubular members typically have tapered threaded ends or connectors that are joined together to form a joint between adjacent tubular members. These tapered threaded connectors must be rotated or coupled together using tools that are capable of applying sufficient torque to one adjacent tubular member while oftentimes the other adjacent tubular member is held substantially rotationally, stationary. To ensure that the shoulders of a joint are butted together properly, it is desirable to torque the joint according to manufacturer's specifications. It is common to refer to the torque required to properly joint together adjacent tubular members as "make-up torque." There are several known methods and tools for applying make-up torque to tubular members.

In one method, the wrench or tool utilized to provide the make-up torque to the tubular members is generally known as pipe tongs. Pipe tongs typically include a set of articulated jaws containing teeth or dies for securely gripping the outer surfaces or diameter of the tubular members. In this method, a first pipe tong is gripped to a tubular member and a second pipe tong is gripped to an adjacent tubular member. By applying force to the pipe tong such that the handles of each pipe tong are forced towards each other a torque is applied to the tubular member. In one aspect, the force may be applied by using a "come-a-long" to the point where an operator determines a "sufficient" amount of torque has been applied to the two tubular members sufficient to meet the manufacturer's recommended torque setting; the sufficiency determination being somewhat arbitrary depending on the operator. Thus, it is oftentimes difficult to apply precisely the manufacturer's recommended make-up torque using this method. In addition, this method may be dangerous in light of the difficulty in controlling the force exerted by the come-a-long in reaching a pre-determined make-up torque. Such lack of control may cause the pipe tongs to fail during operation. Also, conventional pipe tongs tend to be heavy tools and operating them in the field, overhead, and the like further causes dangerous situations for a user.

Additionally, larger pipe tongs used in making up larger diameter tubular members out in the field are substantially larger tools and may weigh a significant amount. Further, oftentimes these pipe tongs may need to be operated moderate distances off of the ground or rig floor. Operating these larger, heavier pipe tongs in these environments may create additional dangers for an operator.

Another method is to apply make-up torque to tubular members with what are commonly known as "power tongs."

Power tongs are large, expensive, complex pieces of equipment that include hydraulically operated jaws that are disposed in a housing. Tubular members that are to be joined are raised and lowered through the housing of the power tongs to present the tubular members to a couple of sets of jaws that grip the tubular members. One set of jaws grips and holds one of the tubular member while another set of jaws grips and rotates the other tubular member. To determine the magnitude of torque applied by the power tongs, the hydraulic pressure that is applied to the rotating set of jaws is monitored and the pressure readings are converted into engineering torque units, such as lb·ft, N·m, ft·lb, etc.

Power tongs require substantial structural frame members and generally are moved on tracks disposed on the floor or rig floor. Because they are large and require tracks to be moved about, they tend to be very expensive and not portable.

SUMMARY OF THE INVENTION

The present invention disclosed herein is directed to a portable torque measurement and notification system and method ("portable torque measurement and notification system")

In one embodiment, the present invention is directed to a portable torque measurement and notification system, including a torque applying device to apply torque to an object, the torque applying device having a handle and a gripping end to engage the object, the torque applying device including one or more strain gages disposed on the handle to produce one or more strain measurements of the handle during the application of the torque; an electronic circuit disposed about the handle to receive the one or more strain measurements, to convert the one or more strain measurements to one or more torque measurements, and to transmit the one or more torque measurements by a wireless communications standard; a power unit to power the one or more strain gages and the electronic circuit; and a wireless device operable to communicate by the wireless communications standard with the torque applying device, the wireless device having a database to store a target torque value and to receive the transmitted one or more torque measurements, and to produce a notifier based on the difference between the one or more transmitted torque measurements and the target torque value.

In one aspect, the one or more strain gages may include a set of two strain gages disposed on the top of the handle and a set of two strain gages disposed on the bottom of the handle. In another aspect, the wireless communications standard may be selected from the group comprising of Bluetooth®, time division multiple access, code division multiple access, global systems for mobile communications, personal communications systems, wireless local area network, and worldwide interoperability for microwave access. In yet another aspect, the wireless communications may be via Bluetooth® wireless standard. In still yet another aspect, the electronic circuit may store algorithms to determine a repetition rate of the notifier based on the difference between the one or more torque measurements and the target torque value.

Additionally, the object may be selected from the group consisting of tubulars, tubular members, coiled tubing members, pipe strings, extended tubular strings, work strings, drillstrings, pipe, and tool strings. The torque applying device and wireless device may communicate wirelessly at an effective range of no more than 10 feet. In another aspect, the torque applying device and wireless device may communicate wirelessly at an effective range of no more than 6 feet. The system may further include a tattle-tale wire disposed on the handle and forming a circuit with the electronic circuit, the tattle-tale wire having a tensile failure rating equal to the maximum strain rating of the handle, wherein exceeding the maximum strain rating of the handle breaks the tattle-wire and the circuit; the broken and/or open circuit is displayed on the wireless device.

In another embodiment, the present invention is directed to a portable torque applying device, including a handle and an operating end for grippingly engaging an object; a first strain gage disposed on one of the top or bottom of the handle to produce one or more strain measurements of the handle; an electronic circuit disposed about the handle to receive the one or more strain measurements, to convert the one or more strain measurements to one or more torque measurements, and to transmit the one or more torque measurements by a wireless communications standard; and a power unit to power the one or more strain gages and the electronic circuit.

In one aspect, the device may further include a second strain gage disposed on the handle on the other of the top or bottom of the handle to produce one or more strain measurement of the handle; the one of the first and second gages measure tension of the handle during operation. In another aspect, the first and second gages may measure compression of the handle operation. In yet another aspect, the operating end may be a set of opposing jaws, the operating end may be a set of articulating opposing jaws, and the operating end is an open-end type tool. In yet another aspect, the operating end may be a closed-end type tool. In still yet another aspect, the operating end may be a chain-type pipe tool.

Additionally, the object may be selected from the group consisting of tubulars, tubular members, coiled tubing members, pipe strings, extended tubular strings, work strings, drillstrings, pipe, and tool strings. Also, device may include a tattle-tale wire disposed on the handle and forming a circuit with the electronic circuit, the tattle-tale wire having a tensile failure rating equal to the maximum strain rating of the handle, wherein exceeding the maximum strain rating of the handle breaks the tattle-wire and the circuit.

In yet another embodiment, the present invention may be directed to a wireless device for producing a notifier to a user of a remote torque applying device, including a transceiver to receive wirelessly one or more torque measurements from the remote torque applying device; a storage unit having a database to store the one or more torque measurements and at least one target torque value; a microprocessor to generate a notifier based on the difference between the one or more torque measurements and the at least one target torque value; and a display to display one or more graphical user interfaces of at least one of the one or more torque measurements, the at least one target torque value, and the notifier to the user.

In one aspect, the transceiver operates Bluetooth® standard for the wireless communication. In another aspect, the remote torque applying device may include a second strain gage disposed on the handle on the other of the top or bottom of the handle to produce one or more strain measurement of the handle. In yet another aspect, the one or more graphical user interfaces includes a display of a current torque measurement of the remote torque applying device. Additionally, the one or more graphical user interfaces may include a display of a peak torque measurement of the remote torque applying device. In still yet another aspect, the one or more graphical user interfaces may include a display of a target torque value.

Further, the one or more graphical user interfaces may include an input field for entering the outer diameter of an object. Also, the one or more graphical user interfaces may include an input field for entering a target torque value. In still yet another aspect, the notifier may be a series of notifiers of increasing repetition rates as the difference between the one or more torque measurements and the target torque value decreases. The notifier may produce a first notifier having a first tone at a first wavelength frequency at the increasing repetition rates as the difference between the one or more torque measurements and a first target torque value less than the target torque value decreases.

Also, the notifier may produce a second notifier having a second tone at a second wavelength frequency at the increasing repetition rates as the difference between the one or more torque measurements and a second target torque value less than the target torque value decreases. In addition, the notifier may produce a third notifier having a third tone at a third wavelength frequency at the increasing repetition rates as the difference between the one or more torque measurements and a third target torque value less than the target torque value decreases. Preferably, the notifier may calculate the repetition rates based on the following formula: Frequency=$10-(T_{Diff}/50)$; where $T_{Diff}$ is the difference between the one or more torque measurements and the target torque value. Also preferably, the notifier may be selected from the group consisting of an aural notifier, audible notifier, tactile notifier, vibratory notifier, vocal notifier, voice notifier, and visual notifier.

In yet another aspect, the aural notifier may be transmitted to a speaker device proximal to a user. Also, the audible notifier may be transmitted to a listening device selected from the group consisting of a wired headphone, earbuds, wireless listening device, wireless earbuds, Bluetooth® headset, and speaker. Further, the tactile notifier may be selected from a corresponding vibration produced by the wireless device. In still yet another aspect, the visual notifier may be selected from a light and a light emitting diode.

In still yet another embodiment, the present invention may directed to a portable torque measurement and notification system, including a torque applying device to apply torque to an object, the torque applying device having a handle and a gripping end to engage the object, the torque applying device including one or more strain gages disposed on the handle to produce a one or more strain measurements of the handle during the application of the torque; an electronic circuit disposed about the handle to receive the one or more strain measurements, to convert the plurality of strain measurements to one or more torque measurements, and to transmit the one or more torque measurements wirelessly; a power unit to power the one or more strain gages and the electronic circuit; a wireless device operable to communicate wirelessly with the torque applying device, the wireless device having a database to store a target torque value and to receive the transmitted one or more torque measurements, and to produce a notifier based on the difference between the one or more transmitted torque measurements to the target torque value; and at least one computing device to communicate wirelessly with the wireless device to receive and store the target torque value and the one or more torque measurements.

In one aspect, the wireless communications standard may be selected from the group comprising of Bluetooth®, time division multiple access, code division multiple access, global systems for mobile communications, personal communications systems, wireless local area network, and worldwide interoperability for microwave access. In another aspect, the object may be selected from the group consisting of tubulars, tubular members, coiled tubing members, pipe strings, extended tubular strings, work strings, drillstrings, pipe, and tool strings.

In another embodiment, the present invention is directed to a method for measuring torque measurement and generating a notifier, including storing one or more target torque values in a wireless device; transmitting a wireless pairing signal from the wireless device; receiving the pairing signal by a torque applying device; applying torque to an object with the torque applying device; measuring the strain of the torque applying device; converting the strain to a torque measurement; and transmitting the torque measurement to the wireless device for notifying a user.

In one aspect, the method may further include converting the strain measurements to the torque measurements by the torque applying device. In another aspect, the measuring the strain may include measuring the strain in the handle of the torque too with one or more strain sensors. In yet another aspect, the transmitting a pairing signal may include transmitting wireless signals via Bluetooth® standard. In still yet another aspect, the object may selected from the group consisting of tubulars, tubular members, coiled tubing members, pipe strings, extended tubular strings, work strings, drillstrings, pipe, and tool strings. Additionally, the method may include generating a notifier based on the difference between the one or more torque measurements and the one or more target torque values. Preferably, the generating the notifier may include increasing the repetition rate as the difference between the one or more torque measurement and the one or more target torque values decreases.

Also preferably, the generating the notifier may include producing a first notifier having a first tone at a first wavelength frequency at the increasing repetition rates as the difference between the one or more torque measurements and a first target torque value less than the target torque value decreases. In one aspect, the generating the notifier may include producing a second notifier having a second tone at a second wavelength frequency at the increasing repetition rates as the difference between the one or more torque measurements and a second target torque value less than the target torque value decreases. In another aspect, the generating the notifier may include producing a third notifier having a third tone at a third wavelength frequency at the increasing repetition rates as the difference between the one or more torque measurements and a third target torque value less than the target torque value decreases.

Preferably, the torque applying device and wireless device may communicate wirelessly at an effective range of no more than 10 feet. Also preferably, the torque applying device and wireless device may communicate wirelessly at an effective range of no more than 6 feet. In an aspect, the notifier may be selected from the group consisting of an aural notifier, audible notifier, tactile notifier, vibratory notifier, and vocal notifier, voice notifier, and visual notifier. The generating the notifier may include producing a first notifier having a first tone at a first wavelength frequency at the increasing repetition rates as the difference between the one or more torque measurements and a first target torque value less than the target torque value decreases. Preferably, producing a second notifier having a second tone at a second wavelength frequency at the increasing repetition rates as the difference between the one or more torque measurements and a second target torque value less than the target torque value decreases. In yet another aspect, the generating the notifier may include producing a third notifier having a third tone at a third wavelength frequency at the increasing repetition rates as the difference between the one or more torque measurements and a third target torque value less than the target torque value decreases.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a perspective view of a torque applying device having a sensor for determining the distance apart of its jaws of the portable torque measurement and notification system according to another embodiment;

FIG. 4A is a perspective view of a different tool end of a torque applying device according to another embodiment;

FIG. 4B is a perspective view of a different tool end of a torque applying device according to another embodiment;

FIG. 6 is an electronic schematic diagram of circuitry of a torque applying device of portable torque measurement and notification system according to an embodiment;

FIG. 7 is a database spreadsheet with columns/rows showing exemplary values of measured torque by a torque applying device of portable torque measurement and notification system according to an embodiment;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
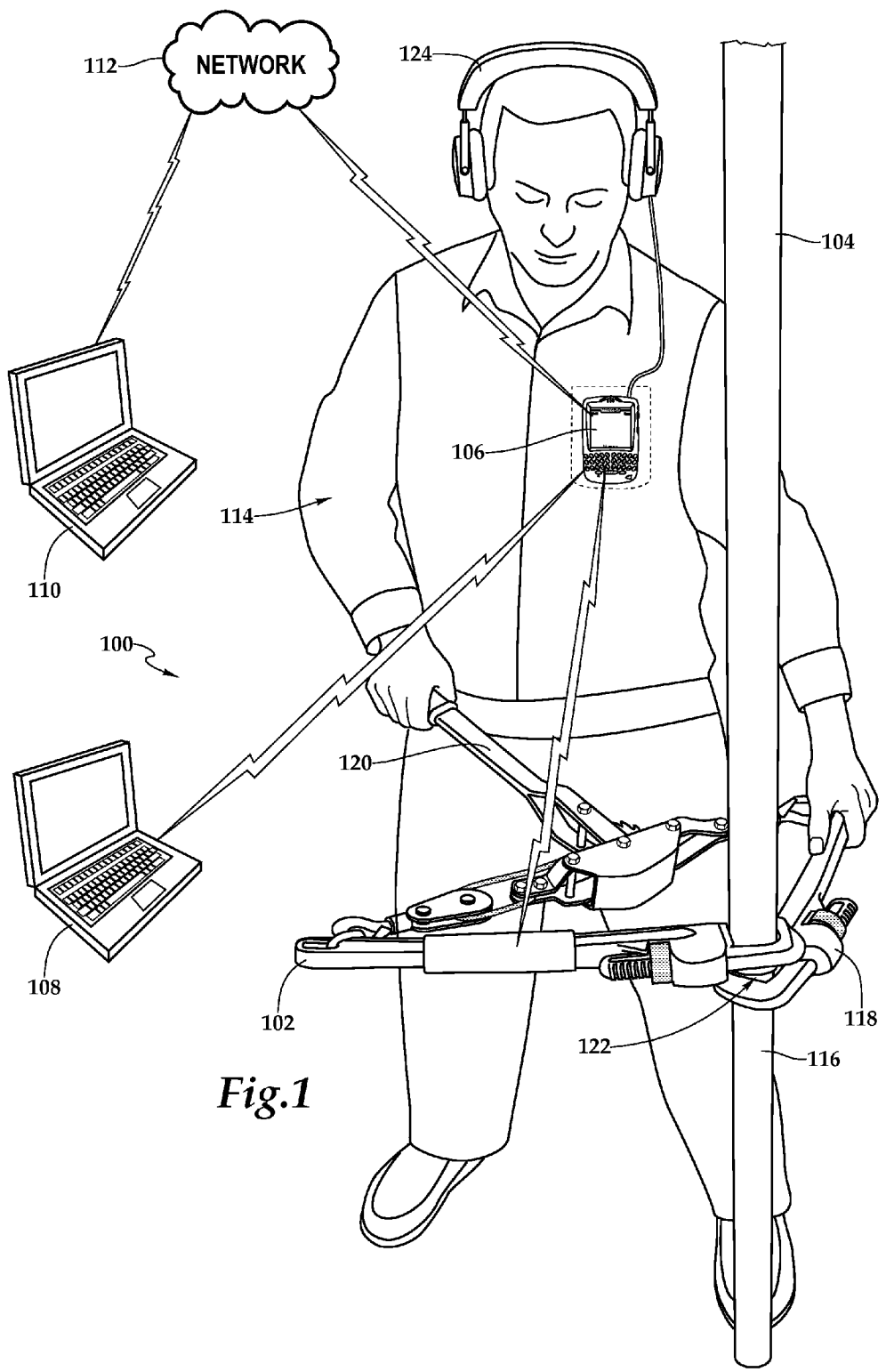
FIG. 1 is a schematic illustration of a portable torque measurement and notification system according to an embodiment.

Referring initially to FIG. 1, a portable torque measurement and notification system is schematically illustrated and generally designated 100. Portable torque measurement and notification system 100 includes a torque applying device 102 for engaging with a tubular member 104 and applying torque to tubular member 104. Portable torque measurement and notification system 100 includes a wireless communications device (wireless device) 106 that is capable to communicating wirelessly with torque applying device 102. Portable torque measurement and notification system 100 further includes one or more computing devices 108 that are in wireless communication with wireless device 106. Additionally, portable torque measurement and notification system 100 may include one or more computing devices 110 that may be in communication with wireless device 106 via any known networks using any known network 112 as further described below.

A user 114 may operate torque applying device 102 to apply torque to tubular member 104 for tightening a threaded end of tubular member 104 with a threaded end of a tubular member 116. In general, user 114 securely grips torque applying device 102 to tubular member 104 and securely grips a conventional wrench 118 to tubular member 116. He then may connect a portable winch 120, such as a "come-along" between torque applying device 102 and wrench 118 to apply the desired or recommended torque to tubular member 104 and tubular member 116 to properly join the two tubular members at joint 122. In one aspect torque applying device 102 may be located above wrench 118 and in another aspect torque applying device 102 may be located below wrench 118 during operation of portable torque measurement and notification system 100.

In another embodiment, 100 may be used without portable winch 120, such that user 114 may apply the force on torque applying device 102 and wrench 118. Additionally, wrench 118 may not be necessary either, as 102 may apply torque to an object, such as tubular members without the need for wrench 118. Also, the present invention is being described applying and measuring torque of torque applying device 102 and wrench to tubular members 104, 116, but the present system may be used when desiring to apply and measure torque applied to any object having any form or shape.

Portable torque measurement and notification system 100 may be used in any type of environments, including in the field, in a shop, and/or or inside a building where pipe strings, coiled tubing strings, tool strings and the like are made up. Although the present portable torque measurement and notification system has been described in relation to tubular members, portable torque measurement and notification system may be used with any types of tools that apply torque or force to another object, regardless of shape, form, etc.

Portable torque measurement and notification system 100 measures the torque applied by torque applying device 102 to tubular member 104 and generates and provides notifiers to user 114 based on actual torque measurements and a target torque value. Such notifiers, as discussed further below, may be any type of notifiers including tactile, visual, auditory, vibratory, and aural, that may be presented to user 114 through listening devices 124. Wireless device 106 may be carried anywhere on user's 114 person, and in one example, wireless device 106 may be carried in a user's 114 pocket. Wireless device 106 may also be carried in a holster that attaches to a belt of user 114, for example.

In another embodiment, portable torque measurement and notification system 100 may generate and provide such notifiers to another user who may then notify user 114 that the target torque value has been achieved. Likewise, any number of users may access any of the computing devices 108, 110 to be notified of any of the data and information herein disclosed and may present such information and data to user 114 or others. Further, wireless device 106 may provide any of the data and notifiers to any other users up to any distance transmittable by wireless device 106.

Figures 2A, 2B, 2C:
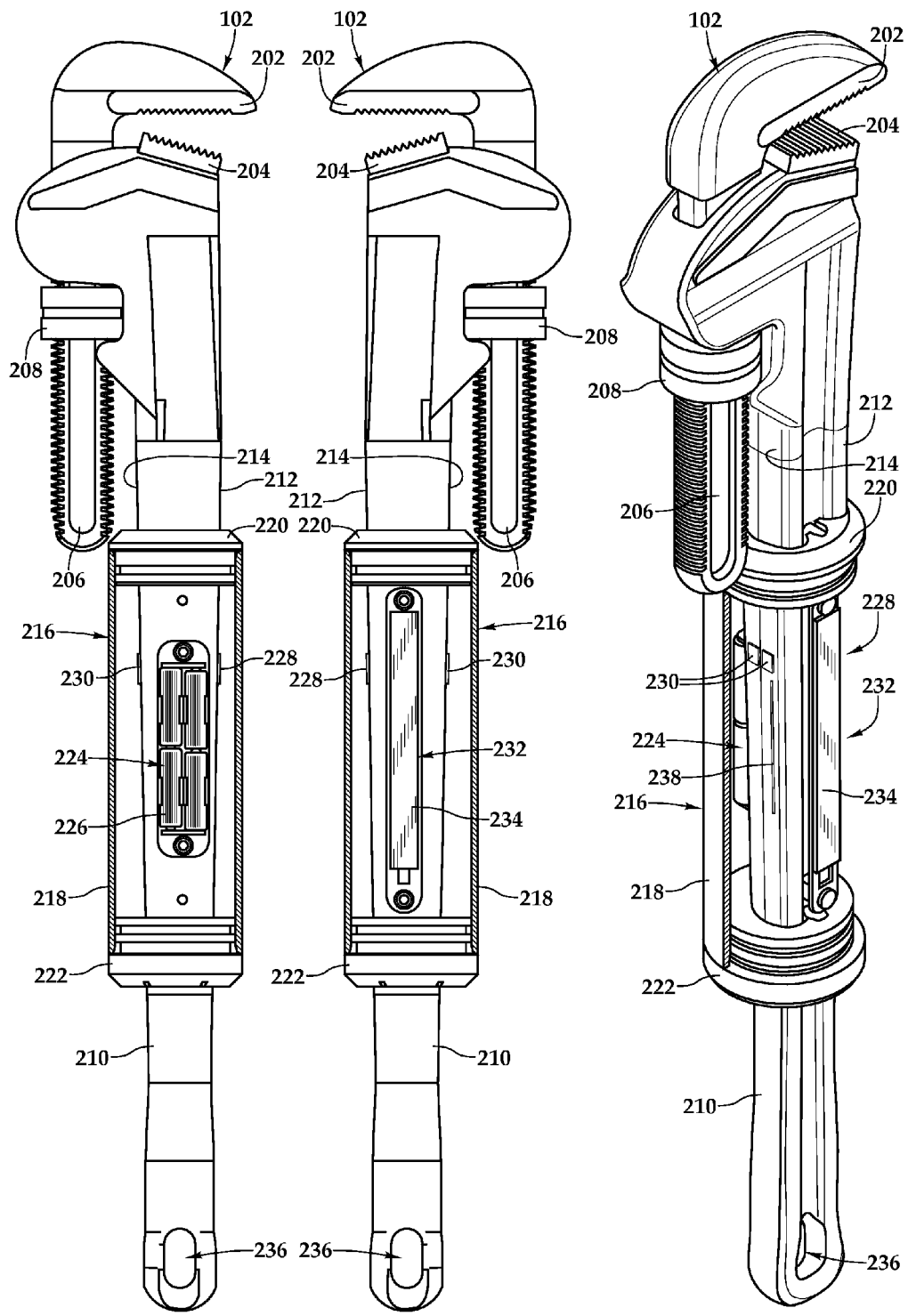
FIG. 2A is a side view of a torque applying device of having a power unit enclosed in a housing disposed about the handle of the torque applying device of the portable torque measurement and notification system according to an embodiment.
FIG. 2B is the opposite side view of the torque applying device of FIG. 2A having electronic circuitry enclosed in the housing disposed about the handle of the torque applying device of the portable torque measurement and notification system according to an embodiment.
FIG. 2C is a perspective partial cutaway view of the torque applying device of FIG. 2A having strain gages enclosed in a housing disposed about the handle of the torque applying device of the portable torque measurement and notification system according to an embodiment.

Turning now to FIGS. 2A-2C, an embodiment of torque applying device 102 is shown in various views. Torque applying device 102 may include an upper jaw 202 and a lower jaw 204 that operate together to securely grip an object, such as tubular members 104, 116. Upper jaw 202 and lower jaw 204 may be teeth and/or dies disposed about the surfaces of each that face each other. Typically, upper jaw 202 is an adjustable jaw that includes a threaded portion 206 at the other end of upper jaw 202 for engaging with a threaded adjustor 208 for adjusting the distance between upper jaw 202 and lower jaw 204. Torque applying device 102 may further include a handle 210 for applying force by either user 114 and/or portable winch 120. Handle 210 typically has a bottom surface 212 and a top surface 214. Extending between bottom surface 212 and top surface 214 are sides of handle 210.

Torque applying device 102 may further include a torque measuring unit 216 that includes a housing 218 that substantially encloses a portion of handle 210. Housing 218 may be any shape or form of housing that substantially encloses all or a portion of handle 210. In one aspect, housing 218 may be a substantially cylindrical housing. Preferably, housing 218 is made and/or formed of a material that doesn't prevent wireless transmissions, such as electromagnetic waves, radio frequency signals, etc., from transmitting between torque applying device 102 and wireless device 106.

Torque measuring unit 216 may further include housing members 220, 222 for providing a sealing enclosure at the ends of housing 218 to handle 210. Housing members 220, 222 may be any shape or form, and in one embodiment they may be substantially disk-shaped objects that have portions of material removed or voids formed for accepting the cross-section of handle 210 when they are joined with housing 218. Preferably, housing members 220, 222 may have additional holes or vias for accepting wires and the like from additional sensors that may be disposed about torque applying device 102. Preferably, housing members 220, 222 are made of flexible, elastic, and the like material such that they do not interfere or counter the bending or flex of handle 210 during operation of torque applying device 102.

Torque applying device 102 further includes a power unit 224 that may be disposed about bottom surface 212, top surface 214 and/or sides of torque applying device 102 for powering the electronics contained within torque measuring unit 216 of torque applying device 102. In one embodiment, power unit 224 may include one or more batteries 226 as known to those skilled in the arts. Preferably, batteries 226 have good temperature variation performance, such that they provide substantially stable voltage through a wide range of environmental operating conditions. In one embodiment, batteries 226 may be lithium iron disulfide batteries, which provide very good low temperature performance.

In one embodiment, torque measuring unit 216 may further include one or more strain gages 228 disposed substantially about bottom surface 212 and one or more strain gages 230 disposed substantially about top surface 214 of handle 210 of torque applying device 102 for detecting the strain of handle 210 when applying force and/or torque to tubular member 104. In one embodiment, strain gages 228, 230 are sets of two "foil-type" strain gages adjacent to each other that are disposed about the bottom surface 212 and top surface 214, respectively, of handle 210 in a location that is provides optimal sensitivity to the strain, flex, compression, tension, and the like of handle 210 of torque applying device 102 during operation of torque applying device 102.

Preferably, strain gages 228, 230 may have insulating flexible backing having an adhesive for adhering to bottom surface 212 and top surface 214 of handle 210. Adhesives may be used for affixing strain gages 228, 230 to bottom surface 212 and top surface 214 of handle 210. As handle 210 is deformed during operation, strain gages 228, 230 are slightly deformed causing the electrical resistance of strain gages 228, 230 to change. Any type of strain gage that is mountable to torque applying device 102 and that can provide strain readings of handle 210 during operation of torque applying device 102 may be used. In one embodiment, strain gages 228, 230 are manufactured by Omega Engineering, Inc. and have part number SGD-7/1000-DY11, for example. Technical specifications of this strain gage are incorporated herein by reference.

Torque measuring unit 216 further includes an electronic circuitry 232, such as printed circuit board ("PCB") PCB 234, that is described further with reference to FIG. 6. PCB 234 may be affixed, attached, and/or adhered to one of the sides of handle 210 by any known means, such as by use of adhesives, fasteners, bolts, screws, and the like. In one embodiment, power unit 224 may be located or disposed on one side of handle 210 and electronic circuitry 232 may be located or disposed on the opposite side of handle 210. Preferably, power unit 224 and electronic circuitry 232 are completely enclosed within housing 218 of torque measuring unit 216 to provide protection of them from the elements during operation of torque applying device 102. Additionally, handle 210 of torque applying device 102 may include a via or hole 236 for accepting fasteners, rings, hooks, and the like of portable winch 120.

In one embodiment, torque applying device 102 may further include one or more tattle-tale wires 238, as best shown in FIG. 2C, for providing notification to user 114 that torque applying device 102 may have been over torqued. If torque applying device 102 was operated beyond its designed limitations, tattle-tale wires 238 may break indicating that torque applying device 102 may need to be replaced. In one embodiment, electronic circuitry 232 of torque applying device 102 may sense that tattle-tale wires 238 has been compromised, broken, and/or open and report such status to wireless device 106 and/or computing devices 108, 110. In general, tattle-tale wires 238 may be located where compression and/or tension of handle 210 of torque applying device 102 occurs. In one aspect, tattle-tale wires 238 may be located or disposed about the bottom surface 212 and/or top surface 214 of torque applying device 102. In another aspect, tattle-tale wires 238 may be substantially proximal to strain gages 228, 230.

In general, if torque applying device 102 is over torqued during normal operations, strain gages 228, 230 may indicate such a condition to electronic circuitry 232 for transmitting to computing devices 108, 110 and user 114. Tattle-tale wires 238 may be useful when torque applying device 102 may be in an off state and be over torqued.

In addition to the strain gages used for sensing strain, another strain sensitive element will be installed in a high strain area of the wrench handle. This strain sensitive element will be constructed such that it will be permanently altered if the wrench is ever subjected to excessive torque. As a safety and health check for the wrench, the condition of this element will be monitored by the on-board electronics and if an "over-torque" history is sensed this will be indicated on the phone application and may be used to make the wrench inoperable.

Referring now to FIG. 3, another torque applying device is schematically illustrated and generally designated 300. Torque applying device 300 includes all of the elements and features of torque applying device 102. Torque applying device 300 includes upper jaw 302, lower jaw 304, threaded portion 306, threaded adjustor 308, handle 310, bottom surface 312, top surface 314, torque measuring unit 316, housing 318, housing members 320, 322, power unit 324, batteries 326, strain gages 328, 330, electronic circuitry 332, PCB 334, and hole 336. Preferably, torque measuring unit 316, housing 318, housing members 320, 322 are made of flexible, elastic, and the like material such that they do not interfere or counter the bending or flex of handle 210 during operation of torque applying device 102. The location and functionality of these common elements and features are similar and/or identical to those related elements and features described above with reference to torque applying device 102.

In this embodiment, torque applying device 300 may further include a jaw distance sensor 338 that may be wired to PCB 334 of electronic circuitry 332 of torque applying device 300. Jaw distance sensor 338 measures and/or senses the distance between upper jaw 302 and lower jaw 304 and transmits this data to PCB 334 of torque measuring unit 316 for calibration purposes as further described below. In another embodiment, jaw distance sensor 338 may be disposed or located substantially about top surface 314 for determining the distance between upper jaw 302 and lower jaw 304 by measuring the position of threaded adjustor 308 on threaded portion 306. In yet another embodiment, the distance between upper jaw 302 and lower jaw 304 may be determined or measured by indirectly measuring any other parameter between torque applying device 300 and any objects, such as tubular members 104, 116.

Some exemplary jaw distance sensor 338 may include optical sensors, doppler sensors, magnetic sensors, photoelectric sensors, ultrasonic sensors, and the like. In this embodiment, jaw distance sensor 338 provides the distance between upper jaw 302 and lower jaw 304 that is securely gripping a tubular member to determine the outer diameter of the gripped or engaged tubular member. This alleviates the need for a user of portable torque measurement and notification system 100 to make a determination of the outer diameter of a particular tubular member.

In addition to measuring torque and notifying user 114 of proximity of actual torque measurements to target torque value, any and all of the data acquired by wireless device 106 from torque applying devices 102, 300, 400, 450 may be used to determine operations of torque applying devices 102, 300, 400, 450, which measurement came from where and for what purpose, track down issues with torque applying devices 102, 300, 400, 450, limitations of torque applying devices 102, 300, 400, 450, confirm that torque applying devices 102, 300, 400, 450 are operating as expected, design flaws, etc.

Turning now to FIG. 4A, an end of another torque applying device is schematically illustrated and generally designated 400. The operating end of torque applying device 400 is shown in FIG. 4A and in this embodiment it includes a handle 402 that includes some or all of the features previously described above relative to torque applying device 102 and torque applying device 300 for measuring torque applied by torque applying device 400. Torque applying device 400 further includes an opening 404 that is formed by a semi-circular structure formed by a first member 406 and a second member 408 that grip indents, reliefs, and the like of a tubular member, for example. Torque applying device 400 may include ratcheting mechanisms as is commonly known in the arts.

Turning now to FIG. 4B, an end of another torque applying device is schematically illustrated and generally designated 450. The operating end of torque applying device 450 is shown in FIG. 4A and in this embodiment it includes a handle 452 that includes some or all of the features previously described above relative to torque applying device 102 and torque applying device 300 for measuring torque applied by torque applying device 450. Torque applying device 450 further includes a chain 454 for gripping an object, such as a tubular member, for example. Chain 454 may be adjusted and secured by adjustor 456. In addition to these torque applying devices described above, the features and elements for measuring torque applying device may be used with any type of tool, wrench, and the like for measuring the torque applied to an object by such torque applying devices.

Figure 5:
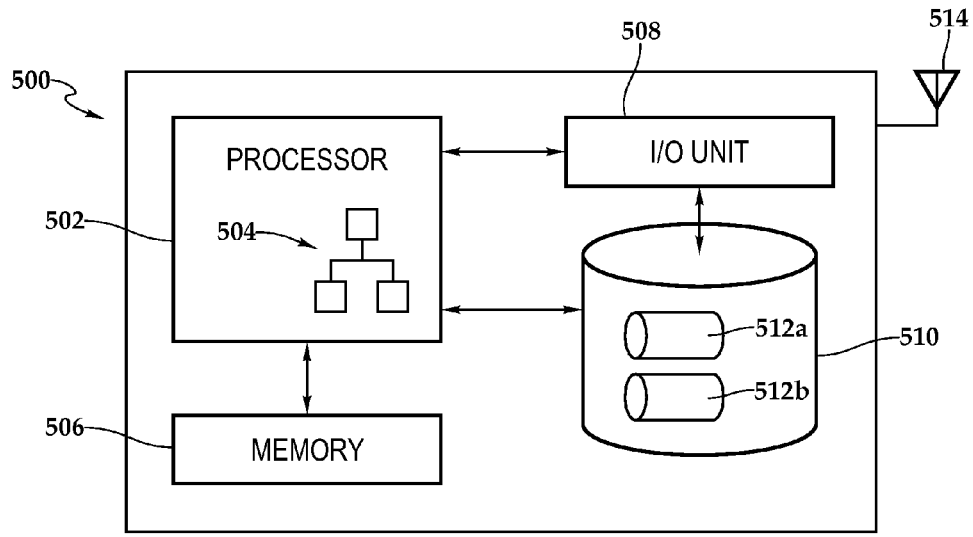
FIG. 5 is a block diagram of components of a computing device of portable torque measurement and notification system according to an embodiment.

With reference now to FIG. 5, a block diagram of exemplary computing devices 108, 110 and wireless device 106 is schematically illustrated and generally designated 500. Computing devices 108, 110 and wireless device 106 may include a processor 502 that executes software 504. Processor 502 may be in communication with memory 506, an input/output ("I/O") unit 508, and a storage unit 510. Storage unit 510 may store databases or data repositories 512a, 512b thereon. Computing devices 108, 110 may further include an antenna 514 for receiving and transmitting data between torque applying device 102 and computing devices 108, 110. Software 504 may include instructions for execution by processor 502 for providing network connectivity and computer status information in accordance with the principles of portable torque measurement and notification system 100. Additionally, portable torque measurement and notification system 100 may include any type of servers and the like that may be used with computing devices 108, computing devices 108, 110 and wireless device 106. Preferably, portable torque measurement and notification system 100 further may include wireless communication capabilities as are commonly known in the arts for communicating with wireless device 106 and/or torque applying device 102 directly. Some exemplary technologies, include Bluetooth, and/or other wireless communication standards herein discussed. In some environments the wireless standards used to communicate between wireless device 106 and torque applying device 102 may be operated at normal wireless signal power outputs such that torque applying device 102 and wireless device 106 may communicate at normal ranges of the wireless standards herein described.

In some other environments, it may be important that the effective distance of the wireless signals between torque applying device 102 and wireless device 106 be limited. For example, drilling operations performed in the field may include perforating devices for perforating casing, tubing, liners, and the like, and oftentimes these perforating devices are operated by wireless standards or technologies. To avoid interfering with these devices, the power of transmitter/transceivers of wireless device 106 and torque applying device 102 may produce a lower than normal power output to as to limit the distance of the wireless signals between torque applying device 102 and wireless device 106.

In one embodiment, the wireless standard used for transmitting the data and information herein described between torque applying device 102 and wireless device 106 may be Bluetooth® standard, or other wireless standard, wherein the power output of the devices may be less than a standard output to limit the range of the wireless signals. In one aspect, the range may be less than 10 feet. In another aspect, the range may be less than 6 feet. In one embodiment, the transmission power of torque applying device 102 and wireless device 106 may be less than 1 mW. In one aspect, the transmission power from about 0.1 mW to about 1.0 mW.

In another embodiment, the wireless standard used for communicating between torque applying device 102 and wireless device 106 in such short range applications may be Near Field Communication ("NFC").

Additionally, wireless device 106 may be operated where no existing wireless communication networks and/or links are available between it and computing devices 108, 110. In such a case, wireless device 106 may store torque measurements and related data and aggregate the data for later transmission once wireless communication network and/or link is established at a later time. Plus, by storing all this information on wireless device 106, user 114 may be able to access this data on location and/or during operation.

Computing devices 108, 110 and wireless device 106 may include any known types of devices that are capable of communicating over antennas 112 as is commonly known in the arts. Wireless device 106 may include mobile phones, cellular phones, Blackberry® wireless devices, iPhone® wireless devices, Android® wireless devices, personal digital assistances ("PDA"), laptops, electronic tablets, personal computers, evolution data optimized ("EVDO") cards, multi-mode devices, and/or other wireless devices and elements.

The portable torque measurement and notification system 100 may include various elements used for wireless and/or wired communication. Network 112 may include mobile switching centers ("MSCs"), local exchanges, networks, antennas or transmission towers, wireless devices, computers, personal computers, servers, computing devices, and wired communication devices for facilitating the transmission of data between computing devices 108, 110 and wireless device 106, in one embodiment.

In one embodiment, computing devices 108, 110 and wireless device 106 may communicate using wireless communications including satellite connections or hardwired connections, such as fiber optics, T1, cable, DSL, high speed trunks, and telephone lines. In one aspect, any number and location of computing devices 108, 110 and wireless device 106 may exist. Further, computing devices 108, 110 and wireless device 106 may communicate with transmission towers using any communications standards, such as time division multiple access ("TDMA"), code division multiple access ("CDMA"), global systems for mobile ("GSM") communications, personal communications systems ("PCS"), wireless local area network ("WLAN"), worldwide interoperability for microwave access ("WiMAX"), or other frequently used cellular and data communications standards and standards.

Network 112 may be any number or combination of networks including wireless networks, data or packet networks, private networks, publicly switched telephone networks ("PSTN"), and/or wired networks. Network 112 of portable torque measurement and notification system 100 may represent a single communication service provider or multiple communications services providers. Network 112 may include any number of systems, towers, servers, and other network and communications devices for implementing the features and performing the methods herein described.

The network 112 may be the Internet, intranet, wide area networks ("WANs"), local area networks ("LANs"), or other communication systems capable of communicating information between computing devices 108, 110 and wireless device 106. Computing devices 108, 110 and wireless device 106 may communicate data packets containing information related to any of the operations of torque applying devices 102, 300, 400, 450 to another computing devices 108, 110, as understood in the art.

Even though FIG. 1 depicts several computing devices 108, 110 and a wireless device 106, it should be understood by those skilled in the art that portable torque measurement and notification system 100 may include any number and type of computing devices 108, 110 and wireless devices 106 without departing from the principles of the present invention.

Referring now to FIG. 6, an electronic schematic diagram of circuitry of an exemplary PCB of torque applying devices 102, 300, 400, 450 is schematically illustrated and generally designated 600. PCB 600 is in communication with strain gages 228, 230 and they may be hard-wired to a strain gage input 601 of PCB 600. In one embodiment, strain gage input 601 is the strain gage input that connects strain gages 228, 230 in a full bridge bending strain configuration. Preferably, two parts are used to form a full bridge. Additionally, PCB 600 may include another set of strain gage inputs 602 that may be used with additional strain gages.

PCB 600 may include a radio frequency ("RF") filter 604 that provides RF filtering prior to sensor signal amplifiers 606, 608. In one embodiment, PCB 600 may further include a capacitor 610 for providing noise filtering. The amplified voltage of sensor signal amplifier 606 is measured by a microcontroller module 612 to obtain a strain reading of torque applying devices 102, 300, 400, 450. In one embodiment, microcontroller module 612 is manufactured by Netburner having part number MOD5213, which is a microcontroller module based on the Freescale MCF5213 ColdFire integrated microcontroller. Microcontroller module 612 may be primary microcontroller of torque applying devices 102, 300, 400, 450 and is responsible for all onboard computation not provided in another subsystem of portable torque measurement and notification system 100.

Sensor signal amplifiers 606, 608 are digitally programmable and are under the control of microcontroller module 612 to compensate for physical properties of torque applying devices 102, 300, 400, 450, including strain/torque relationship, and manufacturing variation. In one embodiment, sensor signal amplifiers 606, 608 are manufactured by Analog Devices having a part number AD8555. PCB 600 may further include voltage dividers 614 that sample the voltage from batteries 226 for measurement by microcontroller module 612. PCB 600 further includes an analog temperature sensor 616 that produces a temperature proportional voltage for measurement by microcontroller module 612. In one embodiment, analog temperature sensor 616 is manufactured by Texas Instruments having part number LM94021.

PCB 600 may also include a battery input connection 618 for connecting with the power output of power unit 224 and/or batteries 226. PCB 600 may further include a diode 620 that provides reverse voltage protection in case batteries 226 are inserted backward into 224. Preferably, a light emitting diode ("LED") 622 is disposed on PCB 600 for reducing the voltage from batteries 226 to a value that is safe to power a voltage regulator 626. Preferably, voltage regulator 626 and capacitors 624 provide a 3.3 volt power supply for the analog subsystem. The power supply is switched on and off under control of microcontroller module 612. A resistor 627 ensures that voltage regulator 626 will shut down when microcontroller module 612 is powered off. A connector 629 and resistor 631 provide access to the diagnostic serial port of microcontroller module 612.

PCB 600 may further include a power supply 630 and capacitors 628 that provide substantially 3.3 volts of regulated power for the digital (primary) subsystem consisting of microcontroller module 612 and a wireless module 642, as discussed further below. In one embodiment, power supply 630 is manufactured by Linear Technology having part number LT1965. Power supply 630 is switched on and off under control of a microcontroller 632, which controls the power on/off state of the primary system (i.e. microcontroller module 612). It receives unregulated battery power through diode 620 and LED 622 such that it is operating at all times when battery power is present. When torque applying devices 102, 300, 400, 450 are in the power off state, microcontroller 632 monitors the state of a power switch 634. When microcontroller 632 senses any change in the state of power switch 634, either opening or closing, it will enable power supply 630, which will power up microcontroller module 612. Microcontroller 632 will hold the power on for several seconds without responding to any input. This permits microcontroller module 612 to complete its boot sequence and begin normal operation, in one embodiment.

After the initial on-time has elapsed, microcontroller 632 monitors a signal received from microcontroller module 612. When the signal goes low (a power off command from microcontroller module 612 to microcontroller 632), microcontroller 632 will signal power supply 630 to power down, removing power to microcontroller module 612 and placing torque applying devices 102, 300, 400, 450 into the power off state.

Preferably, power switch 634 and resistor 636 form the power on switch network. In one embodiment, power switch 634 is a magnetic reed switch manufactured by Cherry having part number MP201701. When power switch 634 is in the open state, resistor 636 provides a logic high signal to microcontroller 632, signaling to microcontroller 632 that power switch 634 is open. When power switch 634 is closed, the signal provided to microcontroller 632 by resistor 636 is pulled to a logic low value by grounding the signal through power switch 634. Microcontroller 632 can then sense the closed state of power switch 634. Resistor 636 has a large value such that battery drain is minimized should power switch 634 remain in the closed state for an extended period. Torque applying devices 102, 300, 400, 450 are powered on by any change in the state of power switch 634, in one embodiment.

A user may use a magnet on the outside of housing 218 to engage power switch 634. In one embodiment, a magnet may be stored in a recess drilled into housing 218 of torque applying devices 102, 300, 400, 450 where it can cause power switch 634 to close. To power the torque applying devices 102, 300, 400, 450 on, the magnet is removed from the recess by hand causing the state of power switch 634 to change and the wrench to power on. The magnet is then returned to the recess for storage (where it is held in place by magnetic force). At this time power switch 634 will close again, but microcontroller 632 will not respond to changes in power switch 634 until it has returned to the off state at the direction of 612. At that time, the state of power switch 634 is ignored but any subsequent change in the state of power switch 634 will cause a power on transition.

Analog power from voltage regulator 626 is controlled at the discretion of firmware embedded in microcontroller module 612. This permits the analog subsystem to be shutdown independent of the primary digital systems to conserve power. PCB 600 may further include a LED 638 for providing power on indication under the control of microcontroller 632. Additionally, PCB 600 may include a integrated circuit serial programming connector 640 that provides in-circuit programmability for microcontroller 632. This permits the firmware for microcontroller 632 to be downloaded into microcontroller 632. PCB 600 may further include wireless module 642. In one embodiment, 642 is a Bluetooth wireless module manufactured by Parani having part number ESD200. Wireless module 642 implements the Bluetooth Serial Port Profile ("SPP") such that microcontroller module 612 can communicate with wireless module 642 using a standard universal asynchronous receiver/transmitter ("UART") serial interface. Firmware embedded in microcontroller module 612 controls and configures the operation of wireless module 642, but the implementation of the Bluetooth standard is contained entirely within wireless module 642, in one embodiment.

In one embodiment, strain gage input 602 may be used by the PCB layout software to reserve two through hole positions on the PCB 600 where strain gage shield wires anchor and connect to ground.

Turning now to FIG. 7, an exemplary database of computing devices 108, 110 and wireless device 106 is schematically illustrated and generally designated 700. Database 700 may include a plurality of fields for inputting and storing data transmitted from torque applying devices 102, 300, 400, 450. For example, database 700 may include a plurality of rows 722a-722n for inputting data from torque applying devices 102, 300, 400, 450 during a particular operation. Each of rows 722a-722n may input and store data for a different operation of torque applying devices 102, 300, 400, 450. In addition, database 700 may include a plurality of fields for inputting and storing data for each of these operations, such as a date field 702, time field 704, job field 706, operator field 708, temperature field 710, voltage field 712, coiled tubing tool field 714, outer diameter field 716, target torque value field 718, and peak torque measurement field 720, for example.

In one embodiment, one of rows 722a-722n may correspond to a particular use or operation of torque applying devices 102, 300, 400, 450. For example, row 722a shows a particular date and time in date field 702 and time field 704 relating to a particular use of torque applying devices 102, 300, 400, 450. Additionally, it may show a particular job site or location information in job field 706. Further, it may show a particular operator, by name or some other identifier, in operator field 708 that operated torque applying devices 102, 300, 400, 450 at that date, time, and location. Similarly, data and information relating to environmental temperature may be inputted and stored in temperature field 710. Also, the voltage provided by power unit 224 and/or batteries 226 may be inputted and stored in voltage field 712. The particular information relating to which tubular member and/or tool that was being torqued during that time and date of the operation may be inputted and stored in coiled tubing tool field 714. Outer diameter field 716 may be used to input and store information relating to the outer diameter of the tubular member that torque applying devices 102, 300, 400, 450 was engaged with for purposes of calibration and the like may be inputted and stored in outer diameter field 716. The set target torque value for that particular joint between the tubular members may be inputted and stored in target torque value field 718. Further, the peak torque measurement provided by torque applying devices 102, 300, 400, 450 during that particular operation may be inputted and stored in peak torque measurement field 720. In addition to the fields shown, database 700 may include any number of other fields and data that relate to a particular operation of torque applying devices 102, 300, 400, 450.

Figure 8:
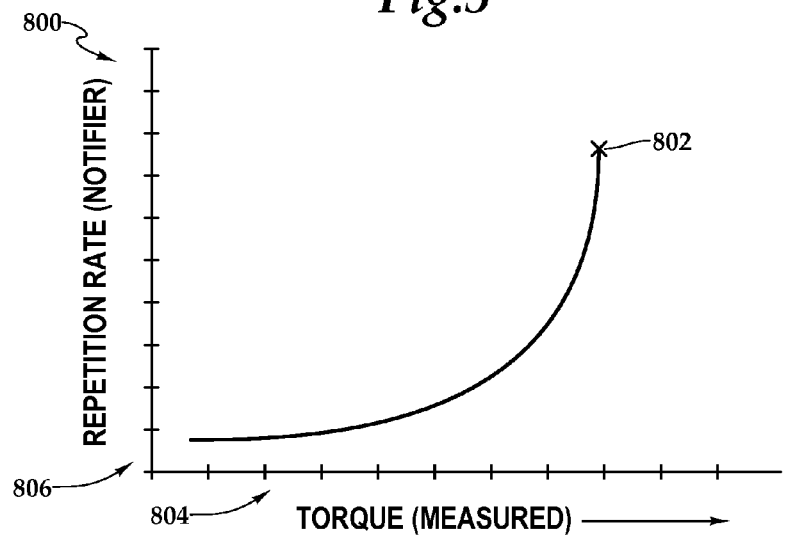
FIG. 8 is a graphical illustration of varying repetition rates of notifiers as a function of proximity of actual torque measurement to target torque value of portable torque measurement and notification system according to an embodiment.

Referring now to FIG. 8, a graphical illustration of the repetition rate of tones generated by wireless device 106 is schematically illustrated and generally designated 800. A data curve is shown that may generally represent in one embodiment of wireless device 106 generating repetition rates for notifiers. A target torque value 802 is determined and as the current torque measurement 804 approaches target torque value 802, the frequency of the repetition rates for the notifiers 806 is increased notifying user 114 that the target torque value 802 is being approached and/or reached.

Target torque value 802 may be any torque value and may be entered by user 114, and or programmed into computing devices 108, 110, and/or wireless device 106. The algorithm for producing the data curve may be any desired algorithm such that it produces a different repetition rate of the notifier to quickly and conveniently notify user 114 that the torque applied to torque applying devices 102, 300, 400, 450 is approaching or has reached target torque value 802 without user 114 having to guess how close the applied torque is to target torque value 802. The shape of the data curve is exemplary, and it may be any shape desired by a user 114 and/or operator of portable torque measurement and notification system 100.

Figure 9:
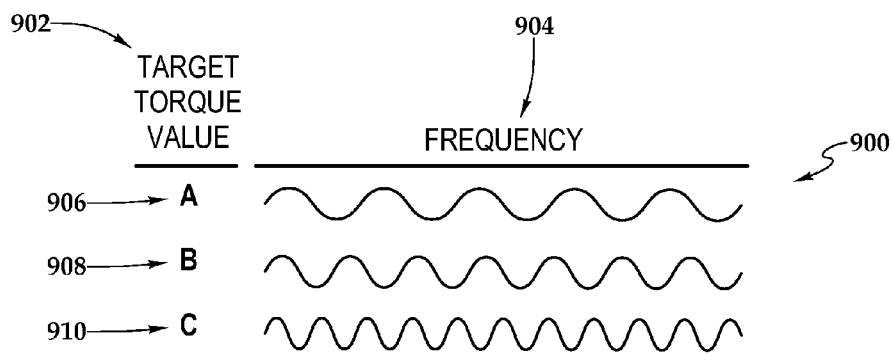
FIG. 9 is an illustration of varying wavelength frequencies of notifiers according to an embodiment.
Figures 10, 11:
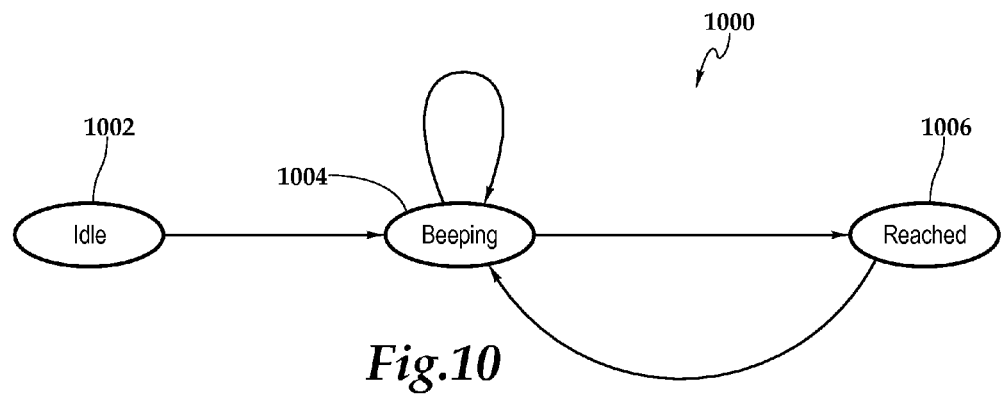
FIG. 10 is an illustration of a process for generating varying repetition rates for notifiers of portable torque measurement and notification system according to an embodiment.
FIG. 11 is exemplary tabular representation of different tones and repetition rates of notifiers of portable torque measurement and notification system according to an embodiment.
Figure 12:
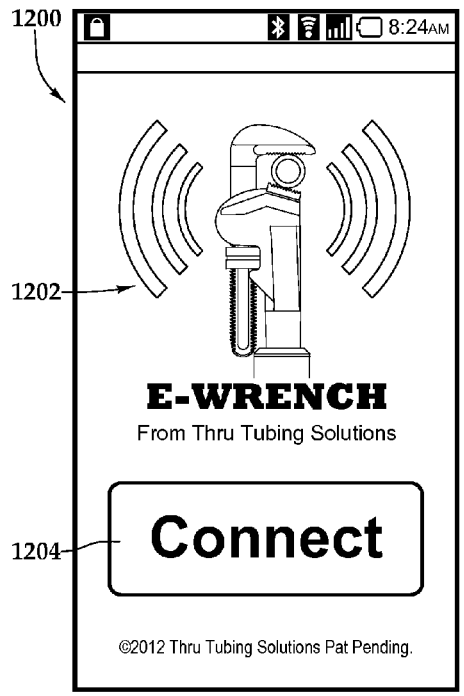
FIG. 12 is an exemplary screenshot of a graphical user interface ("GUI") for displaying wireless device startup functionality of portable torque measurement and notification system according to an embodiment.

Now turning to FIG. 9, an exemplary illustration an different wavelength frequencies of notifiers corresponding to different target torque values is schematically illustrated and generally designated 900. Portable torque measurement and notification system 100 may provide for using different notifiers (tactile, aural, audible, visual, etc.) that may correspond to different target torque values for providing quick and convenient notifiers to user 114 to alert them that a different target torque value has been set for a particular tubular member, tool, and/or joint 122 in a string of tubular members, for example. For example, should a particular tool or tubing string require one or more different target torque values for making up the tool string, portable torque measurement and notification system 100 may provide a different notifier to user 114 so that they are aware of the different target torque values set. FIG. 10 further provides additional description regarding repetition rates of notifiers.

For example, target torque value 902 "A" may have a value of 500 ft·lb that will have a corresponding notifier, such as an audible tone having a longer wavelength frequency for producing a lower tone or pitch to user 114. In so doing, user 114 understands that the lower tone or pitch of the notifier is associated with a lower target torque value. Additionally, target torque value 902 "B" may have a value of 750 ft·lb that will have a corresponding notifier, such as an audible tone having a shorter wavelength frequency for producing a slightly higher tone or pitch to differentiate it from target torque value 902 "A." In addition, target torque value 902 "C" may have a value of 900 ft·lb that will have a corresponding notifier, such as an audible tone having an even shorter wavelength frequency for producing a even higher tone or pitch to differentiate it from target torque value 902 "A" and "B." FIG. 11 provides additional description regarding notifier tones and/or pitches.

Portable torque measurement and notification system 100 may also provide a series of different tones at increasing repetition rates at different torque values less than the target torque value. For example, portable torque measurement and notification system 100 may provide a notifier at a first tone (vibration, visual, etc.) having an increasing repetition rate that is set to a first torque value, another notifier having a different tone (vibration, visual, etc.) having an increasing repetition rate that is set to a second torque value, and yet another notifier having yet another different tone (vibration, visual, etc.) having an increasing repetition rate that is set to a third torque value.

In this example, the final target torque value may be 1,500 ft·lb, but user 114 desires to be notified when the measured torque applied by torque applying device 102 has reached certain values less than the target torque value, such as at 500 ft·lb, 1,000 ft·lb, and then the target torque value of 1,500 ft, for example. Portable torque measurement and notification system 100 may provide a corresponding notifier, such as an audible tone having a first wavelength frequency (longer/shorter) for producing a lower tone or pitch to user 114. As the measured torque value goes from 0-500 ft·lb the repetition rate of the notifier increases as the measured torque value approaches 500 ft·lb, the repetition rate increase substantially finally ending in a constant tone at a particular wavelength frequency.

Next, as the measured torque value goes to 501 ft·lb a second tone having a different wavelength frequency than the first tone is presented to user 114 at a low repetition rate and as the measured torque value increases towards 999 ft·lb the repetition rate of the second tone increases accordingly. Once the 1,000 ft·lb is reached the second tone may be presented to user 114 as a constant tone, and not a beeping tone. Then as the measured torque value goes to 1,001 a third tone having yet a different wavelength frequency that the first and second tone is presented to user 114 at a low repetition rate and as the measured torque value increases towards 1,500 ft·lb the repetition rate of the third tone increases accordingly, finally ending with a constant tone once the target torque value of 1,500 ft·lb is reached.

In so doing, user 114 understands that the lower tone or pitch of the notifier is associated with a lower target torque value. Additionally, target torque value 902 "B" may have a value of 750 ft·lb that will have a corresponding notifier, such as an audible tone having a shorter wavelength frequency for producing a slightly higher tone or pitch to differentiate it from target torque value 902 "A." In addition, target torque value 902 "C" may have a value of 900 ft·lb that will have a corresponding notifier, such as an audible tone having an even shorter wavelength frequency for producing a even higher tone or pitch to differentiate it from target torque value 902 "A" and "B." FIG. 11 provides additional description regarding notifier tones and/or pitches.

Turning now to FIG. 10, an exemplary illustration an different wavelength frequencies of notifiers corresponding to different target torque values is schematically illustrated and generally designated 1000. Portable torque measurement and notification system 100 may or may not produce a notifier when torque applying devices 102, 300, 400, 450 is idle tone 1002. Once user 114 begins using torque applying devices 102, 300, 400, 450 portable torque measurement and notification system 100 determines that torque applying devices 102, 300, 400, 450 is being operated and may generate an initial repetition tone 1004. Portable torque measurement and notification system 100 may also generate a different notifier corresponding to a target torque value tone 1006 to notify user 114 that the target torque value has been reached. Between initial tone 1004 and target torque value tone 1006, portable torque measurement and notification system 100 may increase linearly and/or non-linearly a repetition rate for notifiers to notify user 114 that the measure torque value of torque applying devices 102, 300, 400, 450 is approaching the set target torque value.

Referring now to FIG. 11, an exemplary illustration an different wavelength frequencies of notifiers corresponding to the proximity of the actual torque measurement to a set target torque value is schematically illustrated and generally designated 1100. Portable torque measurement and notification system 100 may use a plurality of different notifiers, such as tones 1114*a*-1114*n*, to notify user 114 of the proximity of the measured torque value to the set target torque value. For example, a notifier 1114*a* having idle tone 1002 may have a particular sequence number 1102, duration 1104, such as 1000 milliseconds. It may also have corresponding individual tone characteristics, such as a corresponding musical note 1106 ("A"), a particular wavelength frequency 1108 (1760 Hz), a particular duration 1110 (200 milliseconds), and a particular repetition rate 1112(1).

In one embodiment, portable torque measurement and notification system 100 may include algorithms for determining which notifier to generate and its repetition rate. For example, portable torque measurement and notification system 100 plays notifiers that give an indication of the difference between the current torque measurements and target torque values. In one aspect, when the difference between the two is larger, tones, or any other notifier, may be lower in pitch, longer in duration, and are repeated less frequently. Conversely, when the difference between the two is smaller, tones may be higher in pitch, shorter in duration, and are repeated more often. FIG. 11 depicts an exemplary eleven combinations of pitch, duration, and repetition rate used to indicate the difference between the actual torque measurement to the target torque value.

In one embodiment, portable torque measurement and notification system 100 may have three states related to tone generation, idle tone 1002, initial repetition tone 1004, and target torque value tone 1006, as discussed above. The eleven music scale tones shown in FIG. 11 represent eleven consecutive tones from the chromatic music scale. A long series of identical tones is created by playing the same tone repeatedly; portable torque measurement and notification system 100 can then schedule the next tone sequence. In one embodiment, tone sequences may be selected for playback according to the formula: t=1; if T≧500 and t=10−[T/50]; if 0<T<500; where t is the tone sequence number that will be played, and T is the actual torque differential between target torque value and current torque measurement (T=$T_{target}$−$T_{actual}$). This formula provides operator feedback over a 500 ft·lb range with 50 ft·lb resolution.

Notifiers may be any type feedback and/or notifier such as aural, audible, vibratory, tactile, visual, and the like. The repetition rates and other characteristics described above applies as possible to all of these different notifier types. For example, as discussed above relating to an aural notifier, the repetition rates may apply to a tactile, vibratory, and/or visual notifier such that they emit their notification characteristics under the same or similar repetition rate, etc. schemes.

In one embodiment, torque applying devices 102, 300, 400, 450 may be calibrated initially prior to its first use, and in another embodiment, torque applying devices 102, 300, 400, 450 may be calibrated in the field, shop, and any time after its first use. Calibration of torque applying devices 102, 300, 400, 450 should allow for the use of as much of sensor signal amplifier 606 converter range as possible considering the measurement range of torque applying devices 102, 300, 400, 450 and the need for headroom to permit the detection of over-range and under-range conditions. Calibration must accommodate for the possibility of positive apparent strain at zero torque. This apparent strain can prevent the desired lower limit of sensor signal amplifier 606 range from being reached. Consequently, the usable range of the A/D converter is reduced. Small and negative apparent strain can be offset by sensor signal amplifier 606 offset adjustment, in one embodiment.

Calibration of sensor signal amplifier 606 requires the selection of gain and offset values that satisfy generally the following conditions: 70≦G≦1280; 0≦O≦4080; $A_{min}$≦A≦$A_{max}$; where T=torque applied to torque applying devices 102, 300, 400, 450; $T_{max}$=maximum torque range of torque applying devices 102, 300, 400, 450; A=sensor signal amplifier 606 measurement (0-4095); $A_0$=sensor signal amplifier 606 measurement at T=$T_0$, G=$G_0$, O=0, $A_{min}$=preferred minimum (zero torque) sensor signal amplifier 606 measurement (typ. 100); Actual zero torque A may be higher if apparent strain at zero torque yields values higher than $A_{min}$·$A_{max}$=preferred maximum torque sensor signal amplifier 606 measurement (typ. 4000); G=sensor signal amplifier 606 gain (70≦G≦1280); $G_0$=minimum sensor signal amplifier 606 gain (70); O=sensor signal amplifier 606 offset (0≦O≦255); $O_1$=sensor signal amplifier 606 offset (0≦$O_1$≦255) that provides the desired zero strain A value at $G_0$.

In one embodiment, the calibration algorithm may be as follows. Step 1: Determine $O_1$=0 at T=0 and G=$G_0$ such that A=$A_{min}$ or O=0, which ever value of O is higher (i.e. $O_1$ cannot be negative). Step 2: Measure $Z_0$=A at G=$G_0$, T=0, and O=$O_1$. Step 3: Determine $G_1$=G at T=$T_{max}$ and O=$O_0$ such that A=$A_{max}$. Step 4: Compute $Z_1$=($Z_0$−16=$O_1$) $G_1$/$G_0$. This is the zero torque value of A at O=$O_1$ and G=$G_1$. Step 5: Compute $R_0$=$A_{max}$−$Z_1$. This is the range of A as T ranges from 0 to $T_{max}$. Step 6: Compute $G_2$=($A_{max}$−$A_{min}$)/$R_0$·G1. This is the gain that will normalize the range of A.

Step 7: Compute $Z_2$=($Z_0$−16)·$O_1$)$G_2$/$G_0$. This is the zero torque value of A at O=$O_1$ and G=$G_2$. Step 8: Compute $O_2$=($A_{min}$−Z)/16. This is the offset to place zero torque in the desired location when G=$G_2$. Step 9: If $O_2$≧0 use $O_2$ and $G_2$ for calibration. Otherwise, continue with step 10. Step 10: Determine $G_2$=G at T=$T_{max}$ and O=0 such that A=$A_{max}$. Step 11: Use gain $G'_2$ and offset 0 for calibration. The implementation of calibration step 1 requires that the value of $O_1$ be determined. Rather than attempt to compute this value directly, a search algorithm may be used to experimentally determine $O_1$ by taking measurements as O is adjusted over its range. Changing the value of O changes the parameters of the analog signal conditioning system. Some time may be needed to ensure that the data acquisition system reaches a stable state after each change to O.

This includes the digital filtering performed in software 504. Software filters may have a settling time on the order of 1 second, for example. Waiting for this period of time after each experimental test of O causes a very slow calibration sequence. To further speed the implementation of this step, the search algorithm is binary, such that the worst case performance requires approximately $log_2$(256) experimental evaluations of O.

The implementation of calibration step 3 may require the determination of gain $G_1$. Gain g2 may be a coarse gain adjustment that may be selected from a table stored in databases 512a, 512b, for example. Gain g1 may provide fine gain adjustment and can be computed from a formula using an exponential or by table lookup. The algorithm selected for this step begins by setting g1 to its minimum value of 4, for example. A binary search algorithm is used to experimentally determine the value of g2 (using values from a table in memory 506, storage 510 and/or databases 512a, 512b) that may provide the highest value of g2 such that A<$A_{max}$. With this value selected for g2, a second binary search algorithm experimentally determines the value of g1, selecting possible values from a table in memory. The value chosen for g1 is the largest value such that A≦$A_{max}$. As with step 1, software filters may be bypassed in this algorithm.

In one embodiment, an initial calibration may be performed prior to the first use of torque applying devices 102, 300, 400, 450. In this embodiment, torque applying devices 102, 300, 400, 450 are placed in a zero torque state. Next, an "offset" button or selection is displayed on wireless device 106 to user 114. Upon selecting the offset function, wireless device 106 performs steps 1 and 2 described above. Next, user 114 may apply maximum torque to torque applying devices 102, 300, 400, 450. Maximum torque may mean connecting torque applying devices 102, 300, 400, 450 to a known torque standard that may be set at the maximum torque of torque applying devices 102, 300, 400, 450 or some other torque standard that is less than the maximum torque value of torque applying devices 102, 300, 400, 450.

Next a "gain" button or selection is displayed to user 114. By selecting the gain button, the remaining calibration steps described above are performed by wireless device 106. After the initial front end calibration, the parameters needed to configure the analog signal conditioning system have been computed and stored in memory 506. In one aspect, the initial calibration does not need to be repeated unless the physical properties of the wrench have been altered, such as might be caused by over stress or over-torquing of torque applying devices 102, 300, 400, 450. In one aspect, after the initial calibration, a "zero" and "normal calibration" procedure, which do not change the parameters of the analog sub-system, may need to be performed after the initial calibration procedure described above.

In one embodiment, zeroing torque applying devices 102, 300, 400, 450 may be performed in the following manner. In doing so, they can be set to compensate for temperature and other short term errors. With the zero torque applied to torque applying devices 102, 300, 400, 450, wireless device 106 sends a command to torque applying devices 102, 300, 400, 450 that they be set to zero. Torque applying devices 102, 300, 400, 450 records the torque reading (with normal software filtering enabled) to non-volatile memory. This is the zero torque offset. All future torque readings will be adjusted by this amount.

In one embodiment, a later calibration, such as a fine or normal calibration may be performed on torque applying devices 102, 300, 400, 450 subsequent to the initial calibration operation. This later calibration operation may be performed to compensate for the effects of aging of torque applying devices 102, 300, 400, 450. Prior to performing this fine calibration, torque applying devices 102, 300, 400, 450 should be zeroed as described above prior to performing calibration. After it has been zeroed, a known torque, such as 800 ft·lb for example, is applied to torque applying devices 102, 300, 400, 450. Wireless device 106 commands or instructs torque applying devices 102, 300, 400, 450 to calibrate to this torque value. Strain gages 228, 230 are read normally (i.e. with software filtering enabled). Zero torque strain is subtracted from this measured torque value. In one embodiment, a scale factor may be computed by the formula: $f=T/(S-z)$; where f is the scale factor, T is the applied torque, and S is the strain measurement from strain gages 228, 230 with the known torque applied to torque applying devices 102, 300, 400, 450, and z is the zero torque offset. f is stored in non-volatile storage. Future torque readings will be scaled by f.

For performing a calibrated torque computation, the following procedure may be used. The formula for computing torque using the calibration values here is: $T=f(S-z)$; where T is the measured torque, S is the strain measurement, z is the zero torque offset, and f is the calibration factor.

Additional parameters and information relating to calibrating torque applying devices 102, 300, 400, 450 may also be inputted into portable torque measurement and notification system 100. For example, calibrating torque applying devices 102, 300, 400, 450 may require the outer diameter of the known torque standard that torque applying devices 102, 300, 400, 450 is engaged with during calibration for further refining the calibration of torque applying devices 102, 300, 400, 450. In one embodiment, user 114 may enter the outer diameter value into portable torque measurement and notification system 100. In another embodiment, jaw distance sensor 338 may determine the distance between upper jaw 202 and lower jaw that would correspond to the outer diameter of the known torque standard.

Additionally, voltage sensitivity or calibration may also need to be taken into account when calibrating torque applying devices 102, 300, 400, 450. Voltage reading from power unit 224 and/or batteries 226 may be transmitted to wireless device 106 for determining further calibration compensation, that may then be transmitted back to torque applying devices 102, 300, 400, 450 for computing when computing torque measurements of torque applying devices 102, 300, 400, 450 prior to transmitting them to wireless device 106.

Turning now to FIGS. 12-27, they include many different exemplary screen shots of GUIs (corresponding GUIs 1200-2700) that may be displayed to user 114 during operation of portable torque measurement and notification system 100. Some or all of these GUIs may or may not be presented to a particular user 114 depending on the operation of torque applying devices 102, 300, 400, 450 and/or wireless device 106. GUI 1200 may be displayed on one or more of wireless device 106 and computing devices 108, 110, for example. It may display a startup screen 1202 for use by user 114. It may also display a connect button 1204 for operating by user 114 to start a scanning and pairing operation for available torque applying devices 102, 300, 400, 450. GUI 1200 may be displayed by a user seals 114 selecting an application start button or selection displayed on wireless device 106.

Figure 13:
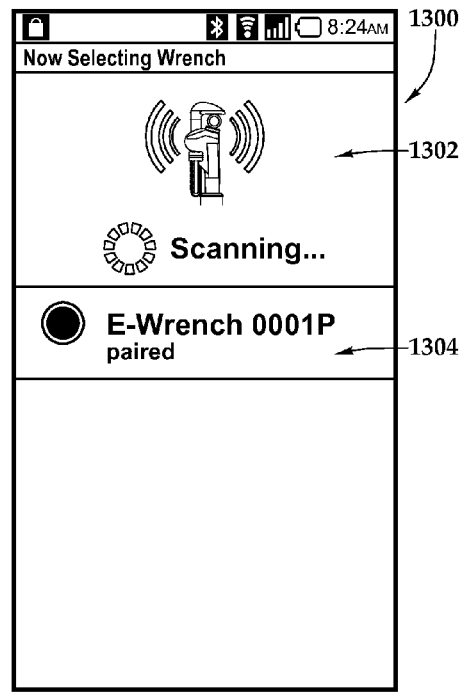
FIG. 13 is an exemplary screen shot of a GUI for displaying scanning activity between a wireless device and a torque applying device of portable torque measurement and notification system according to an embodiment.
Figure 14:
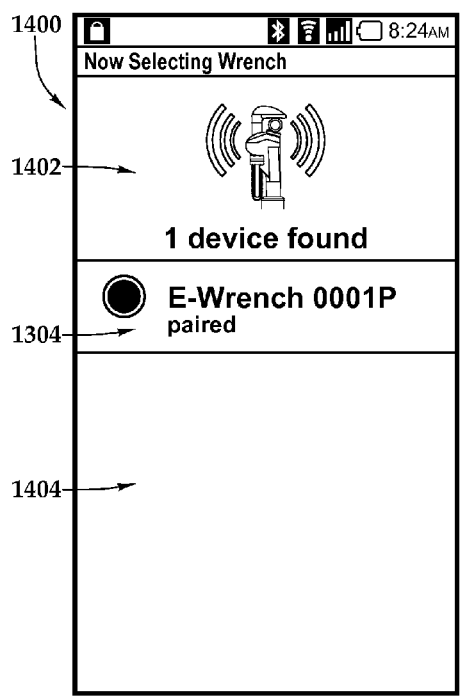
FIG. 14 is an exemplary screenshot of a GUI for displaying available torque applying devices of portable torque measurement and notification system according to an embodiment.
Figure 15:
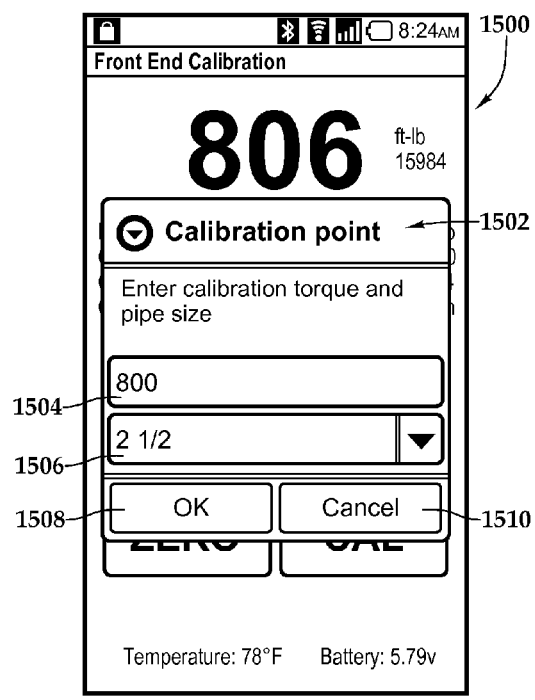
FIG. 15 is an exemplary screenshot of a GUI for displaying initial torque applying device calibration functionality of portable torque measurement and notification system according to an embodiment.
Figure 16:
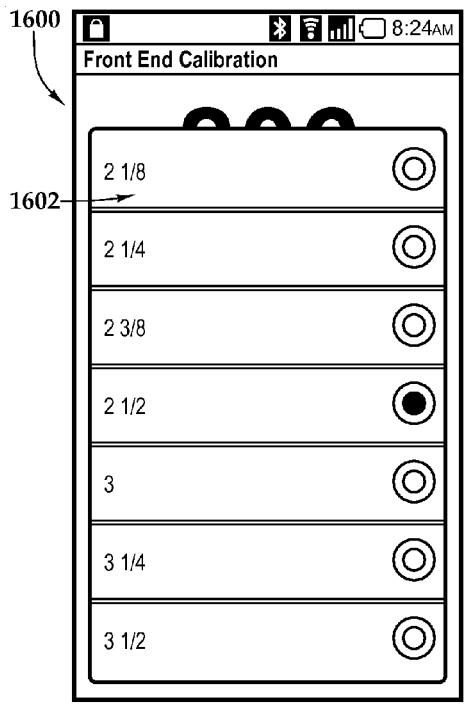
FIG. 16 is another exemplary screenshot of a GUI for displaying initial torque applying device calibration functionality of portable torque measurement and notification system according to an embodiment.
Figure 17:
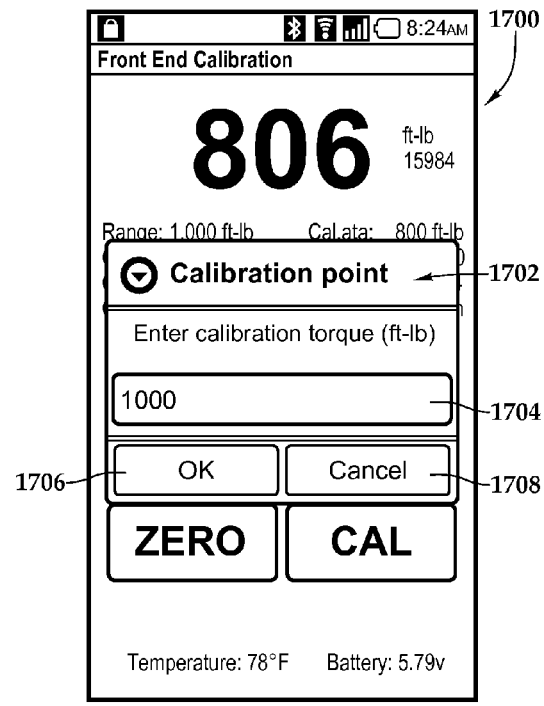
FIG. 17 is another exemplary screenshot of a GUI for displaying initial torque applying device calibration functionality of portable torque measurement and notification system according to an embodiment.
Figure 21:
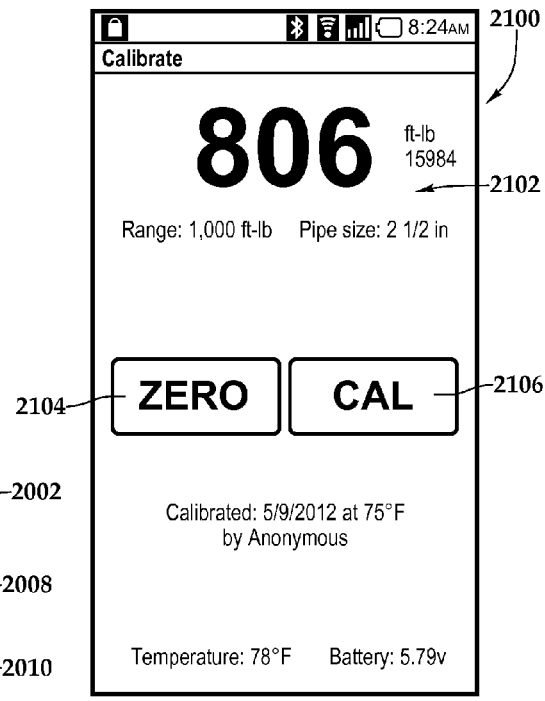
FIG. 21 is an exemplary screenshot of a GUI for displaying torque applying device calibration functionality of portable torque measurement and notification system according to an embodiment.
Figure 22:
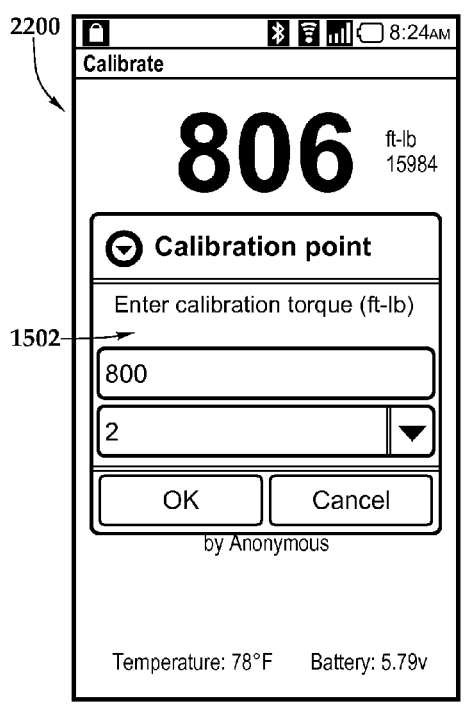
FIG. 22 is another exemplary screenshot of a GUI for displaying torque applying device calibration functionality of portable torque measurement and notification system according to an embodiment.
Figure 23:
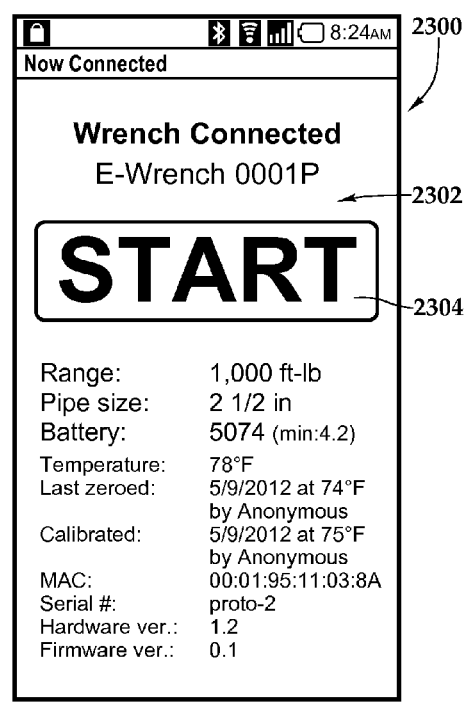
FIG. 23 is an exemplary screenshot of a GUI for displaying torque applying device operation of portable torque measurement and notification system according to an embodiment.
Figure 24:
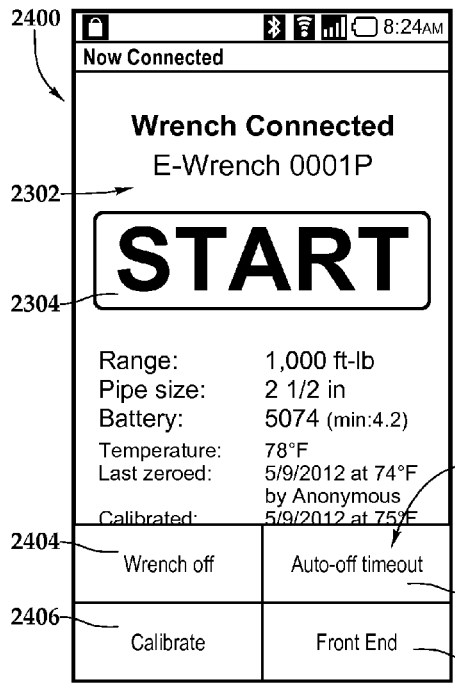
FIG. 24 is another exemplary screenshot of a GUI for displaying torque applying device operation of portable torque measurement and notification system according to an embodiment.
Figure 25:
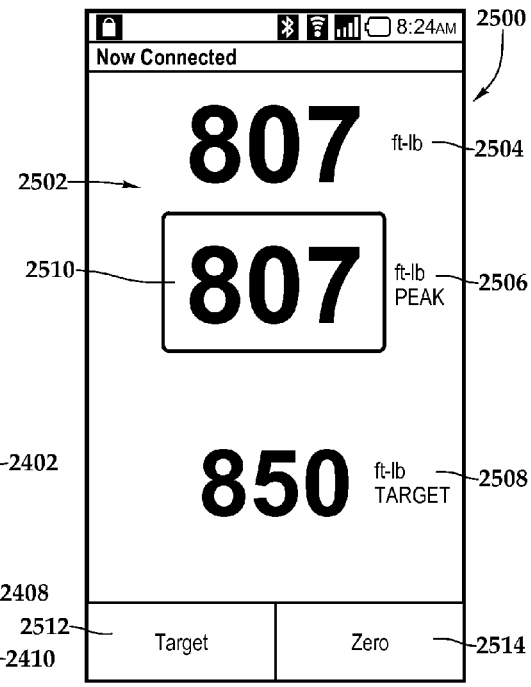
FIG. 25 is another exemplary screenshot of a GUI for displaying torque applying device operation of portable torque measurement and notification system according to an embodiment.
Figure 26:
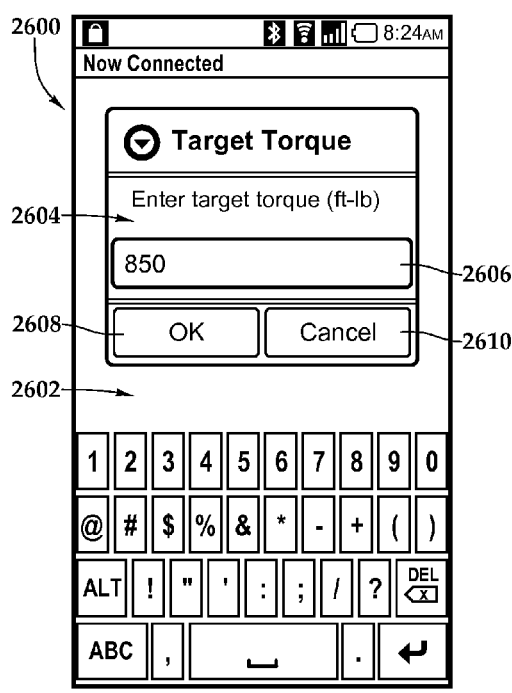
FIG. 26 is another exemplary screenshot of a GUI for displaying torque applying device operation of portable torque measurement and notification system according to an embodiment.

Referring now to FIG. 13, an exemplary screenshot of a GUI for displaying scanning operations of portable torque measurement and notification system is schematically illustrated and generally designated 1300. GUI 1300 may display a scanning status 1302 and a torque applying device paired status 1304 to user 114. Torque applying device paired status 1304 displays a preferable torque applying devices 102, 300, 400, 450 for communicating with wireless device 106. GUI 1300 may be displayed by selecting button 1204. GUI 1400 of FIG. 14 may also be displayed to user 114 that may display 1402 those torque applying devices 102, 300, 400, 450 that were found and paired. Additionally, GUI 1400 may display any other found torque applying devices 102, 300, 400, 450 in portion 1404 of GUI 1400, in one aspect. In one embodiment, GUI 1400 may be displayed automatically after GUI finishes searching and pairing with torque applying devices 102, 300, 400, 450. GUI 1500 displays a calibration point menu 1502 for entering a calibration torque value in field 1504. This value may be entered via a virtual keyboard displayed to user 114 or it may be entered by clicking on a drop down menu that list several different calibration torque values. An alternative to displaying a virtual keyboard, wireless device 106 may display a touch-screen wheel similar to many popular MP3 music players may be used to adjust the target torque value to the desired target value. GUI 1500 may be displayed to user 114 by selecting Cal button 1810 (FIG. 18) and/or Cal button 2106 (FIG. 21).

Calibration point menu 1502 may also include an outer diameter field 1506 for entering the outer diameter of the known torque standard for calibrating torque applying devices 102, 300, 400, 450. Calibration point menu 1502 may further include a "OK" button or selection 1508 for accepting the displayed target torque value and outer diameter displayed in calibration point menu 1502. Calibration point menu 1502 may also include a "Cancel" button or selection 1510 if user 114 desires to cancel calibration point menu functionality.

GUI 1600 may display a list of different outer diameter sizes 1602 for the known calibration standard that may be displayed when target torque value field 1504 may been selected. User 114 may selected any of the displayed outer diameter sizes by clicking in one of the button shown to the right of each size, in one embodiment. In one aspect, once a particular outer diameter size has been selected by user 114, outer diameter sizes 1602 may close and the GUI may return to GUI 1500, for example. In one embodiment, GUI 1600 may be displayed to user 114 by selecting an outer diameter size in the outer diameter field 1506.

Figure 18:
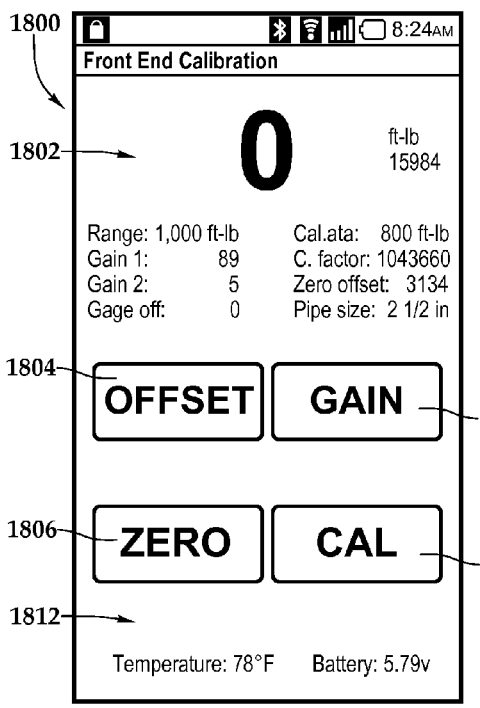
FIG. 18 is another exemplary screenshot of a GUI for displaying initial torque applying device calibration functionality of portable torque measurement and notification system according to an embodiment.
Figure 19:
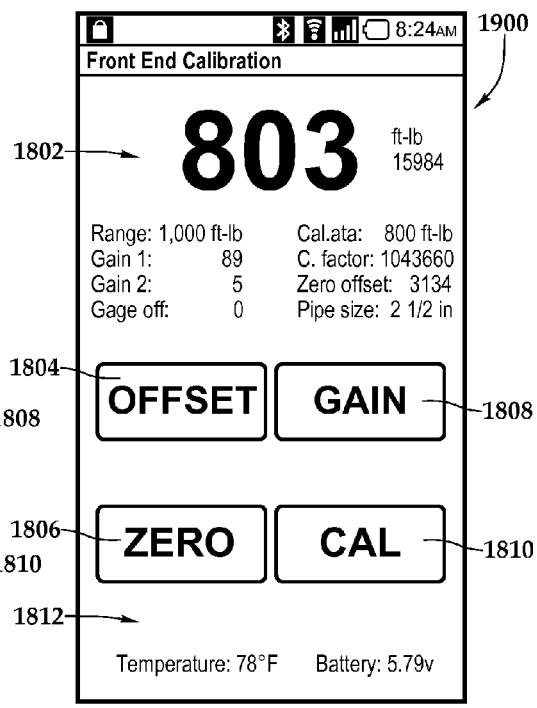
FIG. 19 is another exemplary screenshot of a GUI for displaying initial torque applying device calibration functionality of portable torque measurement and notification system according to an embodiment.
Figure 20:
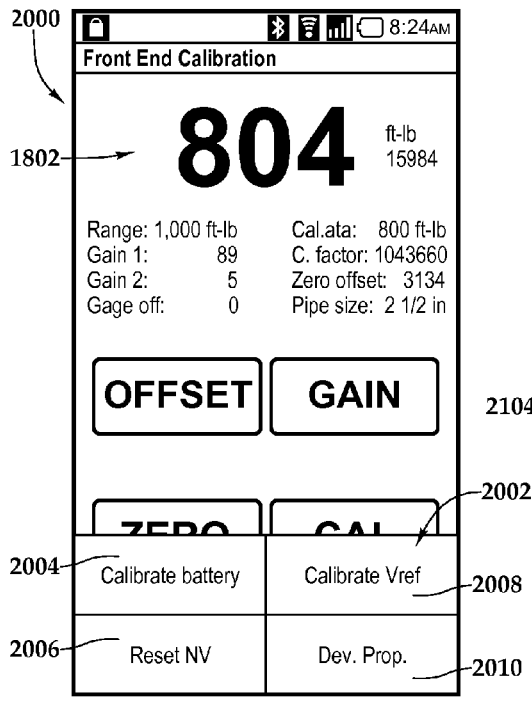
FIG. 20 is another exemplary screenshot of a GUI for displaying initial torque applying device calibration functionality of portable torque measurement and notification system according to an embodiment.

GUI 1700 may display a field for entering the calibration torque value 1702 that may be displayed in response to selecting Gain button 1808 (FIG. 18). A calibration torque value may be inputted in field 1704 with a virtual keyboard displayed to user 114 or by a drop down menu as is commonly known to those skilled in the art. Calibration point menu 1702 may further include a "OK" button or selection 1706 for accepting the displayed target torque value and outer diameter displayed in calibration point menu 1702. Calibration point menu 1702 may also include a "Cancel" button or selection 1710 if user 114 desires to cancel calibration point menu functionality. GUI 1700 may be displayed to user 114 by selecting Gain button 1808 (FIG. 18), in one example.

GUIs 1800 and 1900 displays a display screen 1802 that may include information or data relating to actual torque measurement, range ft-lb, gain 1, gain 2, gage off, cal. ata, zero offset, pipe size, etc. Additionally, they may include an "Offset" button 1804, "Zero" button 1806, "Gain" button 1808, and a calibration "Cal" button 1810. By selecting Offset button 1804 an offset function relating to calibrating torque applying devices 102, 300, 400, 450 as described herein may be performed. Similarly, by selecting Zero button 1806 a zero function relating to calibrating torque applying devices 102, 300, 400, 450 as described herein may be performed. Also, by selecting Gain button 1808 a gain may be determined at a particular torque for calibrating torque applying devices 102, 300, 400, 450 as described herein. GUIs 1800 and 1900 may be displayed to user 114 by selecting Front end button 2410 (FIG. 24), in one example.

GUI 2000 may be displayed when a menu button on wireless device 106 is selected by user 114. In another aspect, GUI 1800 may be displayed by selecting a menu button on GUI 1800. GUI 2000 may include a menu 2002 of functions relating to calibrating torque applying devices 102, 300, 400, 450. For example, menu 2002 may display a "Calibrate battery" button 2004, "Reset NV" button 2006, "Calibrate Vref" button 2008, and a "Dev Prop" button 2010.

GUI 2100 displays a display 2102 that may include a current torque measurement or calibration torque measurement. Additionally, GUI 2100 may include a "Zero" button 2104 and a "Cal" button 2106. By selecting Zero button 1806 a zero function relating to calibrating torque applying devices 102, 300, 400, 450 as described herein may be performed. By selecting Cal button 2106 a calibration function or display relating to calibrating torque applying devices 102, 300, 400, 450 as described herein may be performed or displayed. This particular calibration may be related to the normal or fine calibration operations and not the initial calibration operations as described herein. In one example, GUI 2100 may be displayed to user 114 when the Calibrate button 2406 (FIG. 24) is selected.

GUI 2200 may be displayed when the Cal button 2106 is selected by user 114. Part of the GUI 2200 display may also include calibration point menu 1502 for entering calibration torque values and outer diameter sizes. After torque applying devices 102, 300, 400, 450 has been calibrated, user 114 may be displayed a torque measurement home GUI 2300. GUI 2300 may display a home page display 2302 including information or data relating to type of torque applying devices 102, 300, 400, 450, range, pipe size, battery, temperature, last zeroed, calibrated, media access control ("MAC") address, serial number, hardware version, and firmware version, for example. Additionally, GUI 2300 may display a "Start" button 2304 for starting the torque measurement and notification process with torque applying devices 102, 300, 400, 450. In one example, GUI 2200 may be displayed to user 114 by selecting Cal button 1810 and/or Cal button 2106. In one instance, GUI 2300 may be displayed to user 114 by selecting "wrench" from the list displayed on torque applying device paired status 1304.

GUI 2400 may display a menu 2402 that may include a "Wrench off" button 2404, "Calibrate" button 2406, "Auto-off timeout" button 2408, and "Front end" button 2410 for presenting additional functions and operations to user 114. By selecting Wrench off button 2404 user 114 may turn off torque applying devices 102, 300, 400, 450 manually without waiting on the auto-off timeout function to operate. By selecting Calibrate button 2406 user 114, the normal or fine calibration GUI as described herein may be displayed to user 114. Additionally, should user 114 or another user desire to perform the front end or initial calibration operation, by selecting Front end button 2410 the initial calibration GUIs may be displayed to user 114. In one instance, GUI 2400 may be displayed to user 114 by selecting a menu button displayed on GUI 2300.

Figure 27:
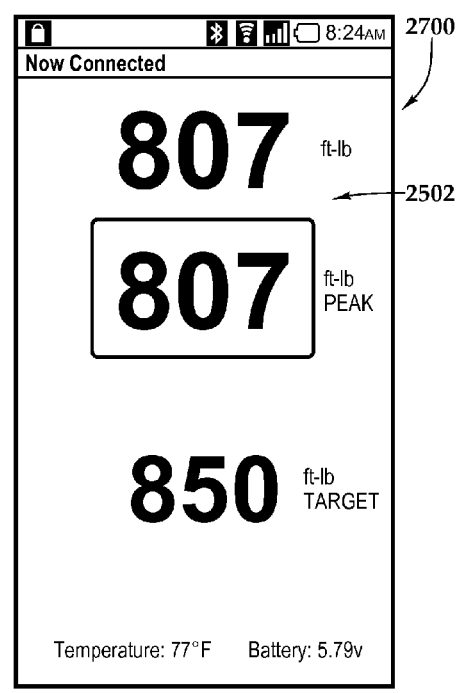
FIG. 27 is another exemplary screenshot of a GUI for displaying torque applying device operation of portable torque measurement and notification system according to an embodiment.

GUIs 2500 and 2700 display to user 114 several different torque measurement or values as described herein. For example display 2502 may include an actual torque measurement 2504 that displays the actual torque measurement of torque applying devices 102, 300, 400, 450 during operation. Further, display 2502 may include a peak torque measurement 2506 that displays the largest or peak torque measurement acquired during an operation of torque applying devices 102, 300, 400, 450. Also, display 2502 may include a target torque value 2508 that is the set target torque value that is the target for reaching during a particular torque operation by torque applying devices 102, 300, 400, 450. In one instance, GUI 2500 may be displayed to user 114 by selecting a menu button displayed on GUI 2700 (FIG. 27). In one example, GUI 2700 may be displayed to user 114 by selecting start button 2304.

GUI 2500 may include a display of the peak torque measurement button 2510 that corresponds to the highest actual torque measurement that has occurred during the torquing operation. As shown, peak torque measurement button 2510 may also serve a dual role as an active button to be selected by user 114 for resetting the actual torque measurement and/or peak torque measurement during any measuring operation. By having this dual functionality, user 114 may be wearing gloves during operation of torque applying devices 102, 300, 400, 450 and still be able to activate the good sized peak torque measurement button 2510 user 114, such as by tapping his pocket to activate peak torque measurement button 2510. In one embodiment, peak torque measurement button 2510 has a black background with a white box for displaying black readout peak torque measurements.

In addition, wireless device 106 may recognize a gesture of some type by user 114 for resetting wireless device 106 during a torque measuring operation. The gesture allows user 114 to make a gesture that wireless device 106 recognizes that user 114 wants to zero wireless device 106. Additionally, such gestures may be recognized by wireless device 106 that user 114 desires to zero wireless device 106, for example. Further, another gesture may be recognized by wireless device 106 that user 114 is finished with the applying torque and measuring torque; and to instruct wireless device 106 to transmit the torque measurements/data to wherever it is desired to be sent.

In another embodiment, wireless device 106 may be programmed such that user 114 may apply torque to torque applying devices 102, 300, 400, 450 to reach a target torque value, and once reached user 114 may contact or touch wireless device 106 to instruct it to set to the next target torque values and parameters for the next joint 122 in the pipe or tool string that user 114 may be assembling. This provides a continuous operation and a excellent data record of sequential torquing operations for a sequence of joint 122 and carefully documents what occurred and when and by whom.

In yet another embodiment, wireless device 106 may be set in an automatic mode where once a target torque value has been reached, wireless device 106 automatically resets for the next joint 122 to be assembled by user 114. In this embodiment, user 114 may continue operating torque applying devices 102, 300, 400, 450 until they are notified that the target torque value has been reached and then they can uncouple torque applying devices 102, 300, 400, 450 from a particular joint 122 and reconnect to the next joint 122 in the tool or pipe string.

Further, GUI 2500 may include a "Target" button 2512 and a "Zero" button 2514. By selecting the Zero button 2514, the zero operation as described herein may be performed. By selecting the Target button 2512, user 114 may be presented with a Target torque input field 2604 as shown with GUI 2600. Target torque input field 2604 may further include a Target torque value 2606 for inputting the target torque value as described herein. Additionally, Target torque input field 2604 may also include an "OK" button 2608 for accepting inputted target torque value and a "Cancel" button 2610 for canceling the target torque value input operation. GUI 2600 may also include a virtual keyboard for entering information and data by user 114, for example. In one instance, GUI 2600 may be displayed to user 114 by selecting peak torque measurement button 2510 and then selecting Target torque value 2606 to bring up virtual keyboard.

Figure 28:
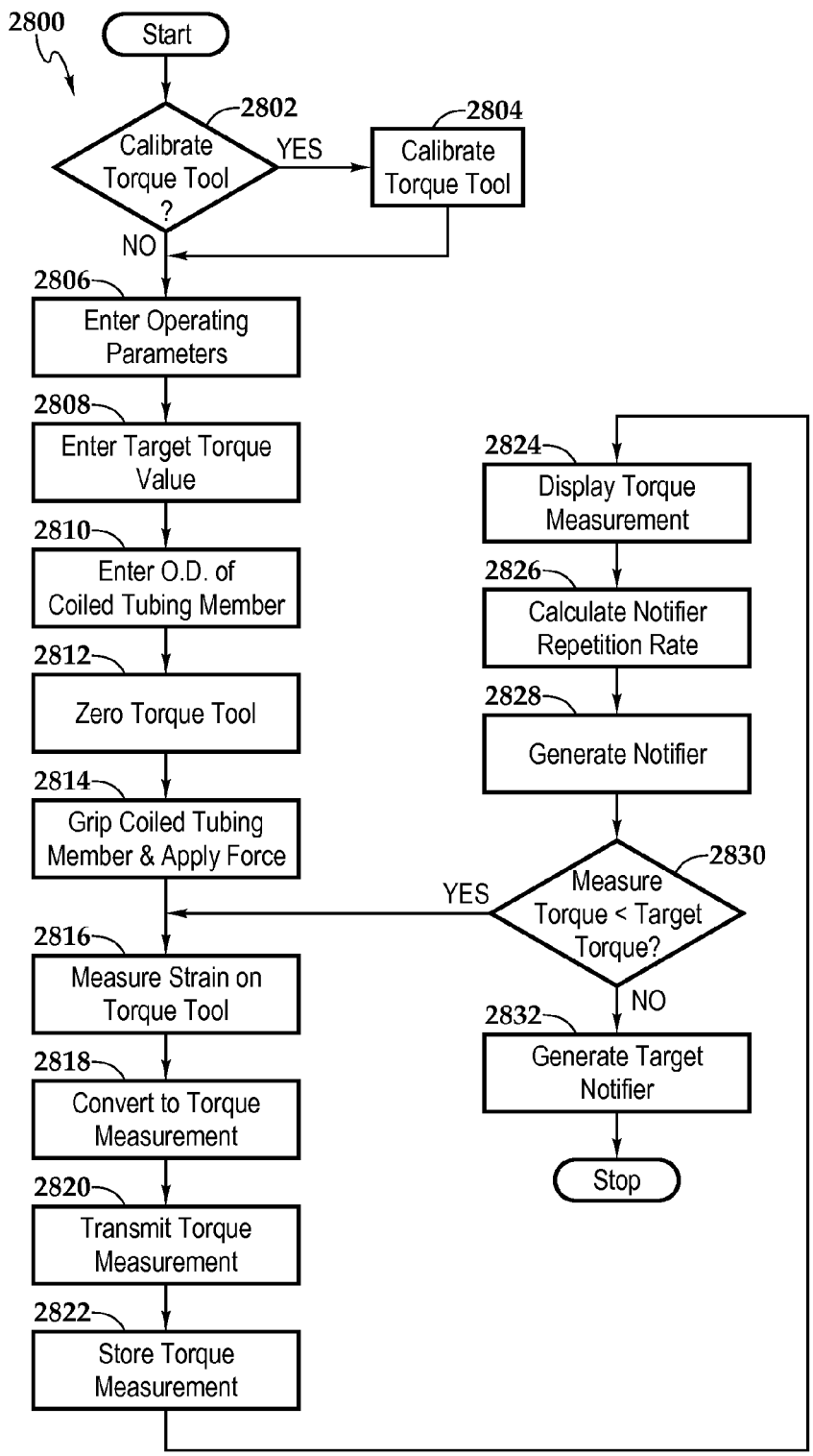
FIG. 28 is a flowchart of a process for measuring and notifying torque measurements to a user according to an embodiment.

Portable torque measurement and notification system 100 further includes methods for measuring torque applied to a tubular member, for example, and notifying a user of the proximity of the actual torque measurement to a set target torque value. With reference to FIG. 28, an embodiment of method for measuring actual torque applied by torque applying devices 102, 300, 400, 450 to a tubular member, for example, is schematically and generally designated 2800. Prior to any of the steps noted below, user 114 may power on torque applying devices 102, 300, 400, 450 by any of the ways described herein, such as by passing a magnet over housing 218, in one example. This operates power switch 634 to power on torque applying devices 102, 300, 400, 450. In step 2802, a query is made regarding whether torque applying devices 102, 300, 400, 450 are to be calibrated prior to taking actual torque measurements. If the answer to this query is yes, then in step 2804 a calibration operation is performed on torque applying devices 102, 300, 400, 450 as described herein. After calibration, the process may proceed to step 2806. If the answer to query is no, then the process proceeds to step 2806, which may be a step where user 114 enters certain parameters relating to the torque operation. This step may also include displaying found and/or paired torque applying devices 102, 300, 400, 450. If more than one torque applying devices 102, 300, 400, 450 are found during the scan, user 114 may be prompted to select one of torque applying devices 102, 300, 400, 450 for operating with wireless device 106.

Step 2808 may include inputting a target torque value that is the goal or target to reach during the torque operation by torque applying devices 102, 300, 400, 450 on a tubular member, for example. Step 2810 may include inputting the outer diameter size of tubular member either manually by user 114 or automatically by jaw distance sensor 338, for example. Step 2812 may include zeroing torque applying devices 102, 300, 400, 450 as described herein prior to applying torque to tubular member.

Step 2814 may include securely gripping coiled tubing and applying torque with torque applying devices 102, 300, 400, 450. In Step 2816, wireless device 106 measures the strain on handle 210 of torque applying devices 102, 300, 400, 450 via strain gages 228, 230. In step 2818, wireless device 106 converts the strain measurements to engineering torque measurements. In step 2820, user 114 may activate start button 2304 instructs wireless device 106 to begin transmitting torque measurements to torque applying devices 102, 300, 400, 450. A stream of torque measurements are transmitted to wireless device 106 during this step, in one example. In one embodiment, these torque measurements are sent at a rate of approximately four times a second.

In another embodiment, wireless device 106 may be displayed a "collect" data button (not shown). By selecting this button, wireless device 106 would obviate all of the extraneous data that may be collected during the torquing operation that really doesn't mean much. Thus, user 114 may determine when and at what time the actual torque measurements are collected by wireless device 106, so that all of the extraneous one may not be transmitted, thus freeing up storage and bandwidth, in one example.

In step 2822, wireless device 106 may store all of the received torque data and in step 2824, wireless device 106 displays the actual torque measurements and peak torque measurements as described herein. In step 2826, wireless device 106 calculates the proximity of the actual torque measurement and/or peak torque measurement to the target torque value and calculates a repetition rate for a particular notifier as described herein.

In step 2828, wireless device 106 provides the generated notifier to user 114 via any means described herein including aural notifiers, audible notifiers, vibratory notifiers, tactile notifiers, visual notifiers, voice notifiers, etc. at a repetition rate to notify user 114 of the proximity of the actual torque measurement to the target torque value. These notifiers may be provided to user 114 via any known means including, earbuds, headphones, speakers, wireless device speakers, wireless headsets, Bluetooth headsets, Bluetooth earbuds, vibrations, tactile actions, lights, vocal commands, etc.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A portable torque measurement and notification system, comprising:
   a torque applying device to apply torque to an object, the torque applying device having a handle and a gripping end to engage the object, the torque applying device comprising:
   one or more strain gages disposed on the handle to produce one or more strain measurements of the handle during the application of the torque;

an electronic circuit disposed about the handle to receive the one or more strain measurements, to convert the one or more strain measurements to one or more torque measurements, and to transmit the one or more torque measurements by a wireless communications standard;

a power unit to power the one or more strain gages and the electronic circuit; and a wireless device operable to communicate by the wireless communications standard with the torque applying device, the wireless device having a database to store a target torque value and to receive the transmitted one or more torque measurements, to display the one or more torque measurements in real-time, and to produce a notifier based on the difference between the one or more transmitted torque measurements and the target torque value, the notifier providing real-time notification of the proximity of the transmitted torque measurements to the target torque value for preventing over-torquing of the object.

2. The portable torque measurement and notification system as recited in claim 1, wherein the one or more strain gages comprises:
a set of two strain gages disposed on the top of the handle and a set of two strain gages disposed on the bottom of the handle.

3. The portable torque measurement and notification system as recited in claim 1, wherein the wireless communications standard is selected from the group comprising of Bluetooth®, time division multiple access, code division multiple access, global systems for mobile communications, personal communications systems, wireless local area network, and worldwide interoperability for microwave access.

4. The portable torque measurement and notification system as recited in claim 1, wherein the wireless communications is via Bluetooth® wireless standard.

5. The portable torque measurement and notification system as recited in claim 1, wherein the electronic circuit stores algorithms to determine a repetition rate of the notifier based on the difference between the one or more torque measurements and the target torque value.

6. The portable torque measurement and notification system as recited in claim 1, wherein the object is selected from the group consisting of tubulars, tubular members, coiled tubing members, pipe strings, extended tubular strings, work strings, drillstrings, pipe, and tool strings.

7. The portable torque measurement and notification system as recited in claim 1, wherein the torque applying device and wireless device communicate wirelessly at an effective range of no more than 10 feet.

8. The portable torque measurement and notification system as recited in claim 1, wherein the torque applying device and wireless device communicate wirelessly at an effective range of no more than 6 feet.

9. The portable torque measurement and notification system as recited in claim 1, further comprising:
a tattle-tale wire disposed on the handle and forming a circuit with the electronic circuit, the tattle-tale wire having a tensile failure rating equal to the maximum strain rating of the handle, wherein exceeding the maximum strain rating of the handle breaks the tattle-wire and the circuit.

10. A portable torque applying device, comprising:
a handle and an operating end for grippingly engaging an object;
a first strain gage disposed on one of the top or bottom of the handle to produce one or more strain measurements of the handle;
a second strain gage disposed on the handle on the other of the top or bottom of the handle to produce one or more strain measurement of the handle;
an electronic circuit disposed about the handle to receive the one or more strain measurements, to convert the one or more strain measurements to one or more torque measurements, and to transmit in real-time the one or more torque measurements by a wireless communications standard; and
a power unit to power the first and second strain gages and the electronic circuit.

11. The portable torque applying device as recited in claim 10, wherein one of the first and second gages measure tension of the handle during operation.

12. The portable torque applying device as recited in claim 10, wherein one of the first and second gages measure compression of the handle operation.

13. The portable torque applying device as recited in claim 10, wherein the operating end is a set of opposing jaws.

14. The portable torque applying device as recited in claim 10, wherein the operating end is a set of articulating opposing jaws.

15. The portable torque applying device as recited in claim 10, wherein the operating end is an open-end type tool.

16. The portable torque applying device as recited in claim 10, wherein the operating end is a closed-end type tool.

17. The portable torque applying device as recited in claim 10, wherein the operating end is a chain-type pipe tool.

18. The portable torque applying device as recited in claim 10, wherein the object is selected from the group consisting of tubulars, tubular members, coiled tubing members, pipe strings, extended tubular strings, work strings, drillstrings, pipe, and tool strings.

19. The portable torque applying device as recited in claim 10, further comprising:
a tattle-tale wire disposed on the handle and forming a circuit with the electronic circuit, the tattle-tale wire having a tensile failure rating equal to the maximum strain rating of the handle, wherein exceeding the maximum strain rating of the handle breaks the tattle-wire and the circuit.

20. A wireless device for producing a notifier to a user of a remote torque applying device, comprising:
a transceiver to receive wirelessly one or more torque measurements from the remote torque applying device;
a storage unit having a database to store the one or more torque measurements and at least one target torque value;
a microprocessor to generate a notifier based on the difference between the one or more torque measurements and the at least one target torque value and to provide the notifier in real-time based on the proximity of the one or more transmitted torque measurements and the at least one or more target torque value; and
a display to display one or more graphical user interfaces of at least one of the one or more torque measurements in real-time, the at least one target torque value, and the notifier to the user.

21. The wireless device as recited in claim 20, wherein the transceiver operates Bluetooth® standard for the wireless communication.

22. The wireless device as recited in claim 20, wherein the remote torque applying device comprises:

a second strain gage disposed on the handle on the other of the top or bottom of the handle to produce one or more strain measurement of the handle.

23. The wireless device as recited in claim 20, wherein the one or more graphical user interfaces comprises:
a display of a current torque measurement of the remote torque applying device.

24. The wireless device as recited in claim 20, wherein the one or more graphical user interfaces comprises:
a display of a peak torque measurement of the remote torque applying device.

25. The wireless device as recited in claim 20, wherein the one or more graphical user interfaces comprises:
a display of a target torque value.

26. The wireless device as recited in claim 20, wherein the one or more graphical user interfaces comprises:
an input field for entering the outer diameter of an object.

27. The wireless device as recited in claim 20, wherein the one or more graphical user interfaces comprises:
an input field for entering a target torque value.

28. The wireless device as recited in claim 20, wherein the notifier is a series of notifiers of increasing repetition rates as the difference between the one or more torque measurements and the target torque value decreases.

29. The wireless device as recited in claim 20, wherein the notifier produces a first notifier having a first tone at a first wavelength frequency at the increasing repetition rates as the difference between the one or more torque measurements and a first target torque value less than the target torque value decreases.

30. The wireless device as recited in claim 20, wherein the notifier produces a second notifier having a second tone at a second wavelength frequency at the increasing repetition rates as the difference between the one or more torque measurements and a second target torque value less than the target torque value decreases.

31. The wireless device as recited in claim 20, wherein the notifier produces a third notifier having a third tone at a third wavelength frequency at the increasing repetition rates as the difference between the one or more torque measurements and a third target torque value less than the target torque value decreases.

32. The wireless device as recited in claim 20, wherein the notifier calculates the repetition rates based on the following formula: Frequency=$10-(T_{Diff}/50)$; where $T_{Diff}$ is the difference between the one or more torque measurements and the target torque value.

33. The wireless device as recited in claim 20, wherein the notifier is selected from the group consisting of an aural notifier, audible notifier, tactile notifier, vibratory notifier, vocal notifier, voice notifier, and visual notifier.

34. The wireless device as recited in claim 33, wherein the aural notifier is transmitted to a speaker device proximal to a user.

35. The wireless device as recited in claim 33, wherein the audible notifier is transmitted to a listening device selected from the group consisting of a wired headphone, earbuds, wireless listening device, wireless earbuds, Bluetooth® headset, and speaker.

36. The wireless device as recited in claim 33, wherein the tactile notifier is selected from a corresponding vibration produced by the wireless device.

37. The wireless device as recited in claim 33, wherein the visual notifier is selected from a light and a light emitting diode.

38. A portable torque measurement and notification system, comprising:
a torque applying device to apply torque to an object, the torque applying device having a handle and a gripping end to engage the object, the torque applying device comprising:
one or more strain gages disposed on the handle to produce a one or more strain measurements of the handle during the application of the torque;
an electronic circuit disposed about the handle to receive the one or more strain measurements, to convert the plurality of strain measurements to one or more torque measurements, and to transmit the one or more torque measurements wirelessly;
a power unit to power the one or more strain gages and the electronic circuit;
a wireless device operable to communicate wirelessly with the torque applying device, the wireless device having a database to store a target torque value and to receive the transmitted one or more torque measurements, to display the one or more torque measurements in real-time, and to produce a notifier based on the difference between the one or more transmitted torque measurements to the target torque value, the notifier providing real-time notification of the proximity of the transmitted torque measurements to the target torque value for preventing over-torquing of the object; and
at least one computing device to communicate wirelessly with the wireless device to receive and store the target torque value and the one or more torque measurements.

39. The portable torque measurement and notification system as recited in claim 38, wherein the wireless communications standard is selected from the group comprising of Bluetooth®, time division multiple access, code division multiple access, global systems for mobile communications, personal communications systems, wireless local area network, and worldwide interoperability for microwave access.

40. The portable torque measurement and notification system as recited in claim 38, wherein the object is selected from the group consisting of tubulars, tubular members, coiled tubing members, pipe strings, extended tubular strings, work strings, drillstrings, pipe, and tool strings.

41. A method for measuring torque measurement and generating a notifier, comprising:
storing one or more target torque values in a wireless device;
transmitting a wireless pairing signal from the wireless device;
receiving the pairing signal by a torque applying device;
applying torque to an object with the torque applying device;
measuring the strain of the torque applying device;
converting the strain to one or more torque measurements;
transmitting the one or more torque measurements to the wireless device for notifying a user; and
displaying on the wireless device the one or more torque measurements in real-time.

42. The method as recited in claim 41, further comprising:
converting the strain measurements to the one or more torque measurements by the torque applying device.

43. The method as recited in claim 41, wherein the measuring the strain comprises:
measuring the strain in the handle of the torque applying device with one or more strain sensors.

44. The method as recited in claim 41, wherein transmitting a pairing signal comprises:
transmitting wireless signals via Bluetooth® standard.

45. The method as recited in claim 41, wherein the object is selected from the group consisting of tubulars, tubular members, coiled tubing members, pipe strings, extended tubular strings, work strings, drillstrings, pipe, and tool strings.

46. The method as recited in claim 41, further comprising:
generating a first notifier based on the difference between the one or more torque measurements and the one or more target torque values.

47. The method as recited in claim 46, wherein the generating the notifier comprises:
increasing the repetition rate as the difference between the one or more torque measurement and the one or more target torque values decreases.

48. The method as recited in claim 46, wherein the generating the notifier comprises:
producing a first notifier having a first tone at a first wavelength frequency at the increasing repetition rates as the difference between the one or more torque measurements and a first target torque value less than the target torque value decreases.

49. The method as recited in claim 46, further comprising:
producing a second notifier having a second tone at a second wavelength frequency at the increasing repetition rates as the difference between the one or more torque measurements and a second target torque value less than the target torque value decreases.

50. The method as recited in claim 46, further comprising:
producing a third notifier having a third tone at a third wavelength frequency at the increasing repetition rates as the difference between the one or more torque measurements and a third target torque value less than the target torque value decreases.

51. The method as recited in claim 41, wherein the torque applying device and wireless device communicate wirelessly at an effective range of no more than 10 feet.

52. The method as recited in claim 41, wherein the torque applying device and wireless device communicate wirelessly at an effective range of no more than 6 feet.

53. The method as recited in claim 41, wherein the notifier is selected from the group consisting of an aural notifier, audible notifier, tactile notifier, vibratory notifier, and vocal notifier, voice notifier, and visual notifier.

54. The method as recited in claim 41, wherein the generating the notifier comprises:
producing a first notifier having a first tone at a first wavelength frequency at the increasing repetition rates as the difference between the one or more torque measurements and a first target torque value less than the target torque value decreases.

55. The method as recited in claim 41, further comprising:
producing a second notifier having a second tone at a second wavelength frequency at the increasing repetition rates as the difference between the one or more torque measurements and a second target torque value less than the target torque value decreases.

56. The wireless device as recited in claim 41, further comprising:
producing a third notifier having a third tone at a third wavelength frequency at the increasing repetition rates as the difference between the one or more torque measurements and a third target torque value less than the target torque value decreases.

* * * * *